United States Patent
Lippert et al.

(10) Patent No.: US 10,843,410 B2
(45) Date of Patent: Nov. 24, 2020

(54) SYSTEM AND METHOD FOR A THREE-DIMENSIONAL OPTICAL SWITCH DISPLAY (OSD) DEVICE

(71) Applicant: Southern Methodist University, Dallas, TX (US)

(72) Inventors: Alexander R. Lippert, Dallas, TX (US); Maha Aljowni, Dallas, TX (US); Bo Li, Dallas, TX (US); Uroob Harris, Irving, TX (US); Cecilia O'Brien, Dallas, TX (US); Daniel Scott Clark, Rocklin, CA (US)

(73) Assignee: Southern Methodist University, Dallas, TX (US)

( * ) Notice: Subject to any disclaimer, the term of this patent is extended or adjusted under 35 U.S.C. 154(b) by 0 days.

(21) Appl. No.: 16/707,649

(22) Filed: Dec. 9, 2019

(65) Prior Publication Data

US 2020/0108557 A1  Apr. 9, 2020

Related U.S. Application Data

(63) Continuation-in-part of application No. 15/287,906, filed on Oct. 7, 2016, now Pat. No. 10,523,924.

(60) Provisional application No. 62/239,352, filed on Oct. 9, 2015, provisional application No. 62/293,128, filed on Feb. 9, 2016, provisional application No. 62/378,367, filed on Aug. 23, 2016.

(51) Int. Cl.
| | | |
|---|---|---|
| B29C 64/273 | (2017.01) | |
| C09D 11/101 | (2014.01) | |
| B29C 64/286 | (2017.01) | |
| B29C 64/393 | (2017.01) | |
| B33Y 70/00 | (2020.01) | |

(52) U.S. Cl.
CPC .......... *B29C 64/273* (2017.08); *B29C 64/286* (2017.08); *B29C 64/393* (2017.08); *B33Y 70/00* (2014.12); *C09D 11/101* (2013.01)

(58) Field of Classification Search
CPC ... B29C 64/273; B29C 64/393; B29C 64/286; B33Y 70/00; C09D 11/101
See application file for complete search history.

(56) References Cited

U.S. PATENT DOCUMENTS

| | | | |
|---|---|---|---|
| 3,609,706 A | 9/1971 | Adamson | |
| 3,609,707 A | 9/1971 | Lewis et al. | |
| 2004/0227694 A1* | 11/2004 | Sun | H04N 13/39 345/6 |
| 2015/0029315 A1 | 1/2015 | Refai et al. | |
| 2017/0104981 A1 | 4/2017 | Lippert et al. | |

* cited by examiner

*Primary Examiner* — Obafemi O Sosanya
(74) *Attorney, Agent, or Firm* — Edwin S. Flores; Chalker Flores, LLP

(57) ABSTRACT

The present invention includes a system, apparatus and method for generating a three-dimensional image and/or printing a three dimensional structures, the system comprising: a medium comprising a photocurable monomer and an optical molecular switch molecule that has a non-fluorescent state and a fluorescent state, wherein the monomer forms a polymer upon exposure to the emitted light. Also taught are novel fluorescent photoswitch molecules.

32 Claims, 24 Drawing Sheets

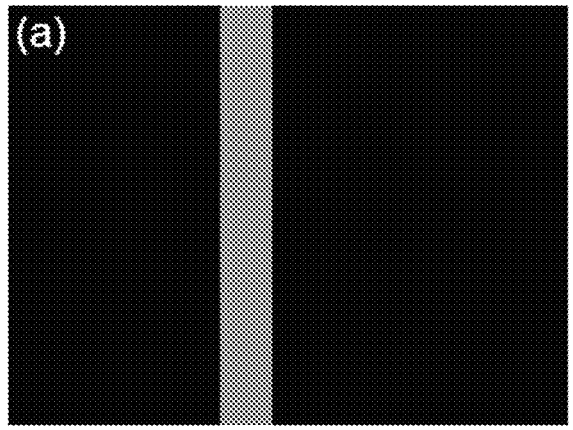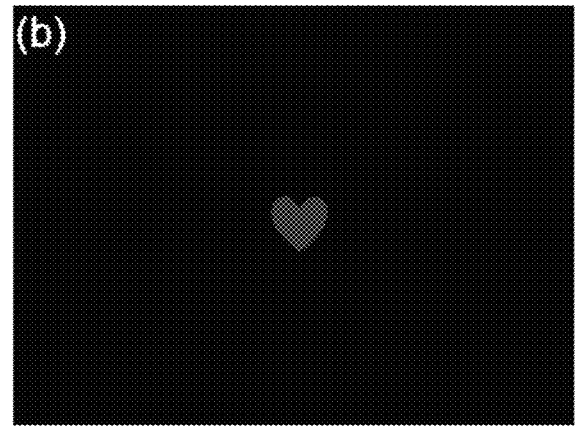
FIG. 11A
FIG. 11B
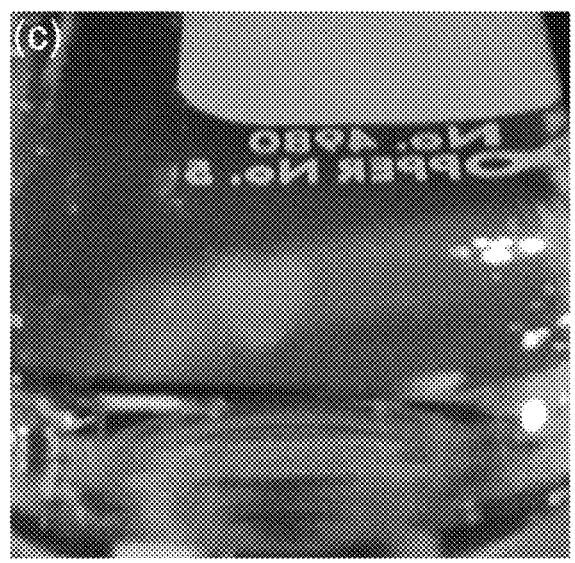
FIG. 11C

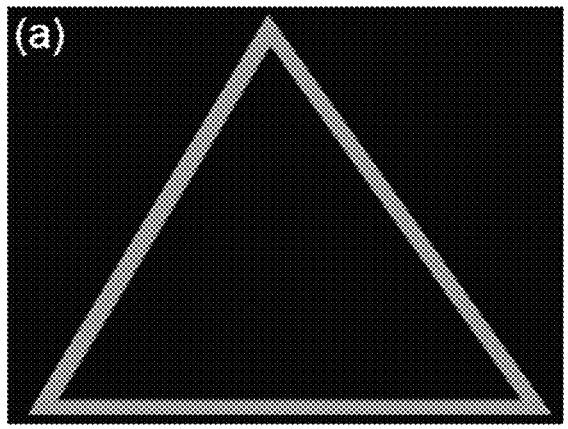
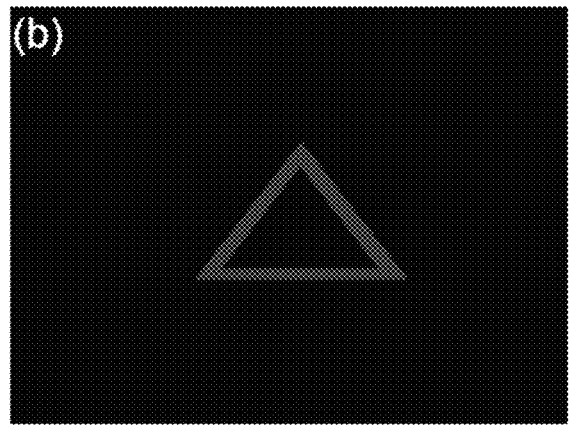
FIG. 12A
FIG. 12B
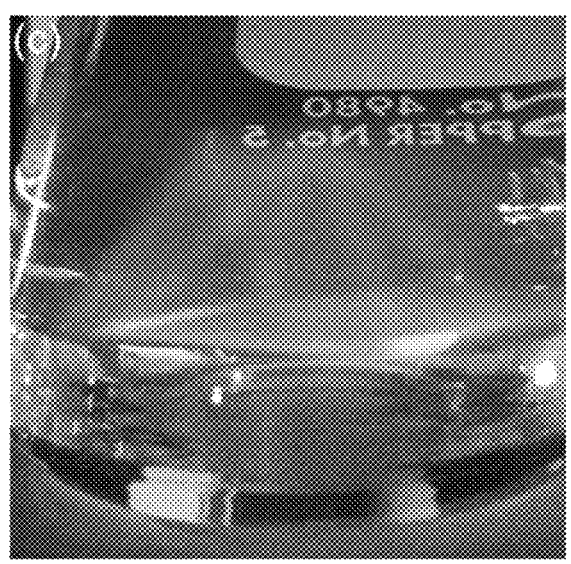
FIG. 12C

SYSTEM AND METHOD FOR A THREE-DIMENSIONAL OPTICAL SWITCH DISPLAY (OSD) DEVICE

CROSS-REFERENCE TO RELATED APPLICATIONS

This application is a continuation-in-part application of U.S. patent application Ser. No. 15/287,906 filed on Oct. 7, 2016, which claims priority to U.S. Provisional Application Ser. No. 62/239,352, filed Oct. 9, 2015, U.S. Provisional Application Ser. No. 62/293,128, filed Feb. 9, 2016, and U.S. Provisional Application Ser. No. 62/378,367, filed Aug. 23, 2016, which the entire contents of each are incorporated herein by reference.

TECHNICAL FIELD OF THE INVENTION

The present invention relates in general to the field of displays, and more particularly, to a system and method for a three-dimensional optical switch display (OSD) device.

STATEMENT OF FEDERALLY FUNDED RESEARCH

None.

BACKGROUND OF THE INVENTION

Without limiting the scope of the invention, its background is described in connection with optical switching.

One example is taught in U.S. Patent Application Publication No. 2004/0227694, filed by Sun and Liu, which discloses a method for a three-dimensional image display using laser induced fluorescence (LIF) of nanoparticles and molecules in a transparent medium. These applicants teach the use of upconversion wherein the stepwise absorbance of two photons from independent laser beams is used to generate a three dimensional image.

Yet another example is found in U.S. Patent Application Publication No. 2015/0029315, filed by Refai, et al., which discloses a system for an ultra high-resolution three-dimensional display. Briefly, an image is generated from two beams of electromagnetic energy. A first wavelength is used to generate an image slice through a chamber and a second beam is shaped with a line generator across a different axis to generate a three dimensional image.

Yet another example is found in U.S. Pat. Nos. 3,609,706 and 3,609,707, which disclose a photochromic dye based volumetric three-dimensional display that uses 1',3',3'-trimethyl-6-nitrospiro(2H-1-benzopyran-2,2'-indoline as a photochromic material.

SUMMARY OF THE INVENTION

In one embodiment, the present invention includes an apparatus for generating a three-dimensional product, the system comprising: a medium comprising an optical molecular switch molecule, wherein the optical molecular switch molecule has a non-fluorescent state and a fluorescent state, wherein at one wavelength of optical excitation the molecule has a first state, and at a second state the optical molecular switch molecule fluoresces at a second wavelength of excitation; a photo-catalyzable or photo-curable monomer in the medium; and at least a first light source and a second light source into the medium, wherein light emitted by the at least first and second light sources are directed to contact the optical molecular switch molecule; wherein the optical molecular switch molecule is converted into a fluorescent "on state" by irradiation from the first light source, and when the second light source irradiates the optical molecular switch molecule in the "on state" the optical molecular switch molecule emits light, wherein the photo-catalyzable or photo-curable monomer polymerizes into a polymer at a point of contact between the first and second light sources. In one aspect, apparatus further includes at least one of: (a) the first and the second light source intersect the optical molecular switch molecule excites and releases light; (b) the first or the second light source is a pulsed laser thereby to produce an improved voxel to background emission; (c) the first and the second light source scan across the medium, wherein the optical molecular switch molecule that excite and emit light in the medium create the three dimensional image; and/or (d) the light sources are selected to match the wavelength of excitation of the optical molecular switch molecule, and/or the first, the second or both light sources are lasers. In another aspect, the optical molecular switch molecule is selected from at least one of an acridine, an anthracene, an arylmethine, a cyanin, a coumarin, an oxacine, an oxadiazole, a naphthalene, a pyrene, a squaraine, a tetrapyrrole, a xanthene, a spirhodamine, a spirolactam rhodamine, or other common fluorescent, phosphorescent, long-lifetime luminescent, or chemiluminescent scaffolds, or derivatives thereof. In another aspect, the optical molecular switch molecule is attached to the medium, and wherein the medium is liquid, solid, a liquigel, organic, inorganic, thixotropic, a crystal, a glass, a gel, a polymer, a gas, and combinations thereof. In another aspect, the optical molecular switch molecule is a protein, and wherein the optical molecular switch molecule is a green fluorescent protein, cyan fluorescent protein, yellow fluorescent protein, red fluorescent protein, gold fluorescent protein a saturation dye, an acceptor fluorophore, a donor fluorophore, and combinations thereof. In another aspect, the optical molecular switch molecule is capable of energy transfer selected from fluorescence resonance energy transfer (FRET), through-bond energy transfer (TBET), or fluorescence resonance energy transfer (FRET) with a molecular-beacon. In another aspect, at least three optical molecular switch molecules excited in the UV range, and emits in a range that triggers polymerization or curing of the photo-catalyzable or -curable monomer in the medium. In another aspect, the optical molecular switch molecule is resuspended in a solvent or a base selected from at least one of dioxane, tetrahydrofuran, acetone, methanol, ethanol, isopropanol, water, diisopropyl ethylamine, pyridine, carbonate, or bicarbonate. In another aspect, the apparatus includes at least one of: (a) each of the first light source or the second light source projects a three-dimensional images by rapid scanning of the first or second light source, and the other light source is synchronized with a changing patterned of light to form a three dimensional image in the medium; (b) each of the first light source or the second light source displays a three-dimensional image by projecting light into a woven pattern into the medium; and/or (c) each of the first light source or the second light source displays a three-dimensional image by projecting light into a diagonal pattern into the medium. In another aspect, an agent that filters stray light is provided in the medium or a surface of a vessel that contains the medium. In another aspect, an angle formed between the light emitted from the first light source and the light emitted by the second light sources is at an angle other than 90 degrees. In another aspect, the first light source, the second light source, or both, is a Digital Light Processor. In another aspect, the first light source is a UV projector with a short pass filter, and the second light source uses a long pass filter before a camera, and optionally the short pass filter is a 395 nm filter, and the long pass filter is at least one of a 515, a 550, or a 590 nm filter. In another aspect, the photo-catalyzable or -curable monomer is selected from at least one of: acrylates, styrene, acrylate functionalized oligomers, styrene functionalized oligomers, or thiol-ene monomers.

In another embodiment, the present invention includes a method of printing a three dimensional object comprising: providing a medium comprising a photocurable monomer and an optical molecular switch molecule, wherein the optical molecular switch molecule has a non-fluorescent state and a fluorescent state, wherein at one wavelength of optical excitation the molecule has a first state and at a second state the molecule fluoresces a second wavelength of excitation; and directing at least a first laser and a second laser into the medium, wherein light emitted by the at least first and second lasers are directed to contact the optical molecular switch molecule in the medium; wherein the optical molecular switch molecule is converted into a fluorescent "on state" by irradiation from the first laser, and when the second laser irradiates the optical molecular switch molecule in the "on state" the optical molecular switch molecule emits light; and wherein the monomer is cured into a polymer at the emitted light. In one aspect, the method further comprising at least one of: (1) the step of intersecting the first and the second laser at the optical molecular switch molecule to excite and release light; (2) the step of pulsing the first or the second laser to produce an improved voxel to background emission in the image; and/or (3) the step of scanning the first and the second laser scan across the medium, wherein the optical molecular switch molecule excites and emits light in the medium create the three dimensional image. In another aspect, the method further comprises the step of selecting the optical molecular switch molecule from at least one of: an acridine, an anthracene, an arylmethine, a cyanin, a coumarin, an oxacine, an oxadiazole, a naphthalene, a pyrene, a squaraine, a spirhodamine, a spirolactam rhodamine, a tetrapyrrole, a xanthene, or other fluorescent, phosphorescent, long-lifetime luminescent, or chemiluminescent scaffolds, or derivatives thereof for the light switching. In another aspect, the method further comprises the step of attaching the optical molecular switch molecule to the medium. In another aspect, the method further comprises the step of selecting the medium from a liquid, solid, a liquigel, organic, inorganic, thixotropic, a crystal, a glass, a gel, a polymer, a gas, and combinations thereof. In another aspect, the method further comprises the step of selecting the lasers to match the wavelength of excitation of the optical molecular switch molecule. In another aspect, the method further comprises the step of selecting the optical molecular switch molecule from one or more fluorescent proteins, a green fluorescent protein, cyan fluorescent protein, yellow fluorescent protein, red fluorescent protein, gold fluorescent protein and combinations thereof. In another aspect, the method further comprises the step of selecting the optical molecular switch molecule from a saturation dye, an acceptor fluorophore, a donor fluorophore, a saturation dye, an acceptor fluorophore, a donor fluorophore, and combinations thereof. In another aspect, the method further comprises the step of selecting the optical molecular switch molecule to be capable of energy transfer selected from fluorescence resonance energy transfer (FRET), through-bond energy transfer (TBET), or fluorescence resonance energy transfer (FRET) with a molecular-beacon. In another aspect, the method further comprises at least one of: (a) the step of selecting the optical molecular switch molecule to provide at least three different colors that provide for color images; (b) the step of viewing the image in three dimensions without glasses or tricking the brain to appear three-dimensional; (c) the step of displaying a three-dimensional images by rapid scanning of the first or second light source, and the other light source is synchronized with a changing patterned of light to form a three dimensional image in the medium; (d) the step of displaying a three-dimensional image by projecting light into a woven pattern into the medium; and/or (e) the step of displaying a three-dimensional image by projecting light into a diagonal pattern into the medium. In another aspect, the optical molecular switch molecule is resuspended in a solvent or a base selected from at least one of dioxane, tetrahydrofuran, acetone, methanol, ethanol, isopropanol, water, diisopropyl ethylamine, pyridine, carbonate, or bicarbonate. In another aspect, an agent that filters stray light is provided in the medium or a surface of a vessel that contains the medium. In another aspect, an angle formed between the light emitted from the first light source and the light emitted by the second light sources is at an angle other than 90 degrees. In another aspect, the first light source, the second light source, or both, is a Digital Light Processor. In another aspect, the first light source is a UV projector with a short pass filter, and the second light source uses a long pass filter before a camera, optionally the short pass filter is a 395 nm filter, and the long pass filter is at least one of a 515, a 550, or a 590 nm filter. In another aspect, the photo-catalyzable or -curable monomer is selected from at least one of: acrylates, styrene, acrylate functionalized oligomers, styrene functionalized oligomers, or thiol-ene monomers.

In another embodiment, the present invention includes a system for printing in three dimensions comprising: an imaging system comprising: a medium comprising a photocurable monomer and an optical molecular switch molecule, wherein the optical molecular switch molecule has a non-fluorescent state and a fluorescent state, wherein at one wavelength of optical excitation the molecule has a first state and at a second state the molecule fluoresces a second wavelength of excitation; at least a first light source and a second light source in optical communication with the medium, wherein light emitted by the at least first and second light sources are directed to contact the optical molecular switch molecule at a specific location in the medium; a memory, configured to store a representation of the three dimensional image; and a processor, operably coupled to the memory and the first light source and the second light source, wherein the processor is configured to direct the first and the second light source into the medium to convert the optical molecular switch molecule into a fluorescent "on state" by irradiation from the first light source, and when the second light source irradiates the optical molecular switch molecule in the "on state" the optical molecular switch molecule emits light at the specific location in the medium, wherein the monomer is cured into a polymer at the emitted light. In another aspect, the photo-catalyzable or -curable monomer is selected from at least one of: acrylates, styrene, acrylate functionalized oligomers, styrene functionalized oligomers, or thiol-ene monomers.

In another embodiment, the present invention includes a printer comprising: an imaging system comprising: a medium comprising a photocurable monomer and an optical molecular switch molecule, wherein the optical molecular switch molecule has a non-fluorescent state and a fluorescent state, wherein at one wavelength of optical excitation the molecule has a first state and at a second state the molecule fluoresces a second wavelength of excitation; at least a first light source and a second light source in optical communication with the medium, wherein light emitted by the at least first and second light sources are directed to contact the optical molecular switch molecule at a specific location in the medium; a memory, configured to store a representation of the three dimensional image; and a processor, operably coupled to the memory and the first light source and the second light source, wherein the processor is configured to direct the first and the second light source into the medium to convert the optical molecular switch molecule into a fluorescent "on state" by irradiation from the first light source, and when the second light source irradiates the optical molecular switch molecule in the "on state" the optical molecular switch molecule emits light at the specific location in the medium, wherein the monomer is cured into a polymer at the emitted light.

In another embodiment, the present invention includes a molecule selected from at least one of:

1

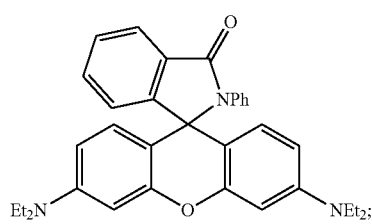

2

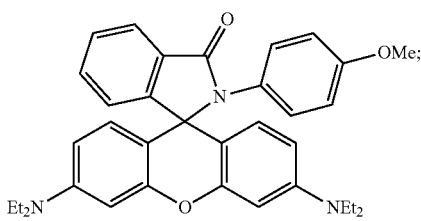

3

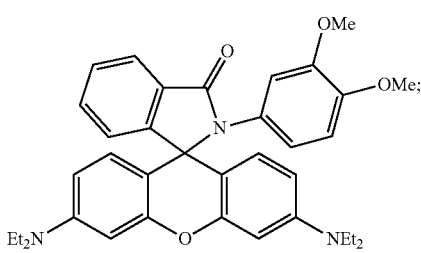

4

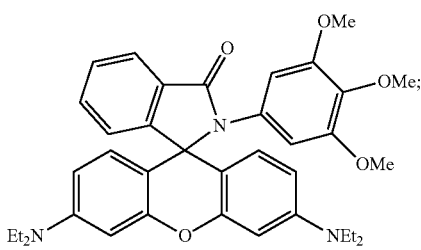

-continued

5

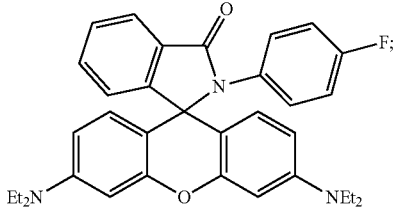

6

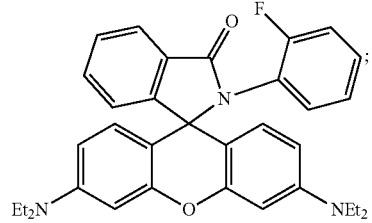

7

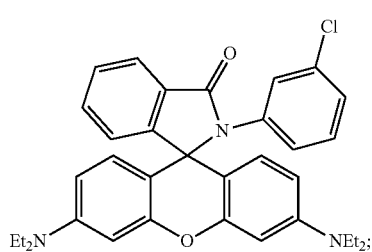

8

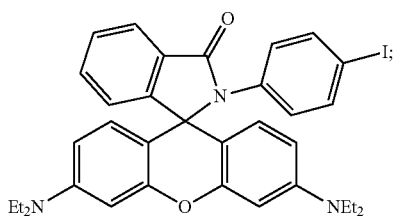

9

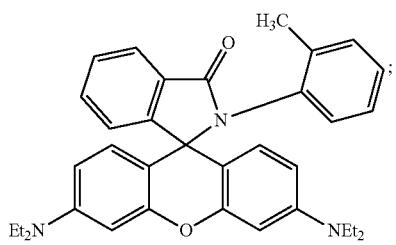

10

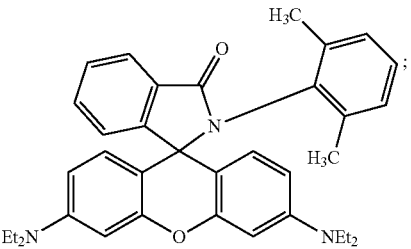

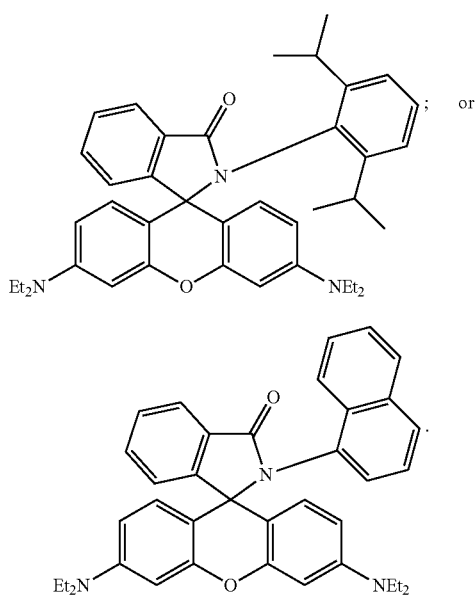

In one embodiment, the present invention includes an apparatus for generating a three-dimensional image, the system comprising: a medium comprising an optical molecular switch molecule, wherein the optical molecular switch molecule has a non-fluorescent state and a fluorescent state, wherein at one wavelength of optical excitation, the molecule has a first state and at a second state the optical molecular switch molecule fluoresces at a second wavelength of excitation; and at least a first light source and a second light source into the medium, wherein light emitted by the at least first and second light sources are directed to contact the optical molecular switch molecule; wherein the optical molecular switch molecule is converted into a fluorescent "on state" by irradiation from the first light source, and when the second light source irradiates the optical molecular switch molecule in the "on state" the optical molecular switch molecule emits light. In one aspect, when the first and the second light source intersect the optical molecular switch molecule excites and releases light. In another aspect, the first or the second light source is a pulsed laser thereby to produce an improved voxel to background emission. In another aspect, the first and the second light source scan across the medium, wherein the optical molecular switch molecule that excite and emit light in the medium create the three dimensional image. In another aspect, the molecule is selected from at least one of an acridine, an anthracene, an arylmethine, a cyanin, a coumarin, an oxacine, an oxadiazole, a naphthalene, a pyrene, a squaraine, a tetrapyrrole, a xanthene, a spirhodamine, spirolactam rhodamine, or other common fluorescent, phosphorescent, long-lifetime luminescent, or chemiluminescent scaffolds, or derivatives thereof. In another aspect, the optical molecular switch molecule is attached to the medium. In another aspect, the light source can be a laser. In another aspect, the medium is liquid, solid, a liquigel, organic, inorganic, thixotropic, a crystal, a glass, a gel, a polymer, a gas, and combinations thereof. In another aspect, the light sources are selected to match the wavelength of excitation of the optical molecular switch molecule. In another aspect, the optical molecular switch molecule is a protein. In another aspect, the optical molecular switch molecule is a green fluorescent protein, cyan fluorescent protein, yellow fluorescent protein, red fluorescent protein, gold fluorescent protein and combinations thereof. In another aspect, the optical molecular switch molecule is a saturation dye, an acceptor fluorophore, a donor fluorophore, and combinations thereof. In another aspect, the optical molecular switch molecule is capable of energy transfer selected from fluorescence resonance energy transfer (FRET), through-bond energy transfer (TBET), or fluorescence resonance energy transfer (FRET) with a molecular-beacon. In another aspect, at least three optical molecular switch molecules are selected to provide at least three different colors that provide for color images. In another aspect, the three dimensional image can be viewed without glasses or tricking the brain to appear three-dimensional. In another aspect, the three dimensional image is volumetric. In another aspect, the first, the second or both light sources are lasers. In one aspect, the optical molecular switch molecule is resuspended in a solvent or a base selected from at least one of dioxane, tetrahydrofuran, acetone, methanol, ethanol, isopropanol, water, diisopropyl ethylamine, pyridine, carbonate, or bicarbonate. In another aspect, each of the first light source or the second light source projects a three-dimensional images by rapid scanning of the first or second light source, and the other light source is synchronized with a changing patterned of light to form a three dimensional image in the medium. In another aspect, each of the first light source or the second light source displays a three-dimensional image by projecting light into a woven pattern into the medium. In another aspect, each of the first light source or the second light source displays a three-dimensional image by projecting light into a diagonal pattern into the medium. In another aspect, an agent that filters stray light is provided in the medium or a surface of a vessel that contains the medium. In another aspect, an angle formed between the light emitted from the first light source and the light emitted by the second light sources is at an angle other than 90 degrees. In another aspect, the first light source is a UV projector with a short pass filter, and the second light source uses a long pass filter before a camera. In another aspect, the short pass filter is a 395 nm filter, and the long pass filter is at least one of a 515, a 550, or a 590 nm filter. In another aspect, the photo-catalyzable or -curable monomer is selected from at least one of: acrylates, styrene, acrylate functionalized oligomers, styrene functionalized oligomers, or thiol-ene monomers.

In another embodiment, the present invention includes a method of generating a three dimensional image comprising: providing a medium comprising a optical molecular switch molecule, wherein the optical molecular switch molecule has a non-fluorescent state and a fluorescent state, wherein at one wavelength of optical excitation the molecule has a first state and at a second state the molecule fluoresces a second wavelength of excitation; and directing at least a first light source and a second light source into the medium, wherein light emitted by the at least first and second light source are directed to contact the optical molecular switch molecule in the medium; wherein the optical molecular switch molecule is converted into a fluorescent "on state" by irradiation from the first light source, and when the second light source irradiates the optical molecular switch molecule in the "on state" the optical molecular switch molecule emits light. In one aspect, the light source can be a laser. In another aspect, when the first and the second light source intersect the optical molecular switch molecule excites and releases light. In another aspect, the first or the second light source is a pulsed laser thereby to produce an improved voxel to background emission. In another aspect, the first and the second light source scan across the medium, wherein the optical molecular switch molecule that excite and emit light in the medium create the three dimensional image. In another aspect, the molecule is selected from at least one of an acridine, an anthracene, an arylmethine, a cyanin, a coumarin, an oxacine, an oxadiazole, a naphthalene, a pyrene, a squaraine, a tetrapyrrole, a xanthene, a spirhodamine, spirolactam rhodamine, or other common fluorescent, phosphorescent, long-lifetime luminescent, or chemiluminescent scaffolds, or derivatives thereof. In another aspect, the optical molecular switch molecule is attached to the medium. In another aspect, the medium is liquid, solid, a liquigel, organic, inorganic, thixotropic, a crystal, a glass, a gel, a polymer, a gas, and combinations thereof. In another aspect, the light sources are selected to match the wavelength of excitation of the optical molecular switch molecule. In another aspect, the optical molecular switch molecule is a protein. In another aspect, the optical molecular switch molecule is a green fluorescent protein, cyan fluorescent protein, yellow fluorescent protein, red fluorescent protein, gold fluorescent protein and combinations thereof. In another aspect, the optical molecular switch molecule is a saturation dye, an acceptor fluorophore, a donor fluorophore, and combinations thereof. In another aspect, the optical molecular switch molecule is capable of energy transfer selected from fluorescence resonance energy transfer (FRET), through-bond energy transfer (TBET), or fluorescence resonance energy transfer (FRET) with a molecular-beacon. In another aspect, at least three optical molecular switch molecules are selected to provide at least three different colors that provide for color images. In another aspect, the three dimensional image can be viewed without glasses or tricking the brain to appear three-dimensional. In another aspect, the three dimensional image is volumetric. In another aspect, the first, the second or both light sources are lasers. In one aspect, the optical molecular switch molecule is resuspended in a solvent or a base selected from at least one of dioxane, tetrahydrofuran, acetone, methanol, ethanol, isopropanol, water, diisopropyl ethylamine, pyridine, carbonate, or bicarbonate. In another aspect, each of the first light source or the second light source projects a three-dimensional images by rapid scanning of the first or second light source, and the other light source is synchronized with a changing patterned of light to form a three dimensional image in the medium. In another aspect, each of the first light source or the second light source displays a three-dimensional image by projecting light into a woven pattern into the medium. In another aspect, each of the first light source or the second light source displays a three-dimensional image by projecting light into a diagonal pattern into the medium. In another aspect, an agent that filters stray light is provided in the medium or a surface of a vessel that contains the medium. In another aspect, an angle formed between the light emitted from the first light source and the light emitted by the second light sources is at an angle other than 90 degrees. In another aspect, the first light source is a UV projector with a short pass filter, and the second light source uses a long pass filter before a camera. In another aspect, the short pass filter is a 395 nm filter, and the long pass filter is at least one of a 515, a 550, or a 590 nm filter.

In yet another embodiment, the present invention includes a system displaying images in three dimensions comprising: an imaging system comprising: a medium comprising a optical molecular switch molecule, wherein the optical molecular switch molecule has a non-fluorescent state and a fluorescent state, wherein at one wavelength of optical excitation the molecule has a first state and at a second state the molecule fluoresces a second wavelength of excitation; at least a first laser and a second light source in optical communication with the medium, wherein light emitted by the at least first and second light sources are directed to contact the optical molecular switch molecule at a specific location in the medium; a memory, configured to store a representation of the three dimensional image; and a processor, operably coupled to the memory and the first light source and the second light source, wherein the processor is configured to direct the first and the second light source into the medium to convert the optical molecular switch molecule into a fluorescent "on state" by irradiation from the first light source, and when the second light source irradiates the optical molecular switch molecule in the "on state" the optical molecular switch molecule emits light at the specific location in the medium. In one aspect, when the first and the second light source intersect the optical molecular switch molecule excites and releases light. In another aspect, the first or the second light source is a pulsed laser thereby to produce an improved voxel to background emission. In another aspect, the first and the second light source scan across the medium, wherein the optical molecular switch molecule that excite and emit light in the medium create the three dimensional image. In another aspect, the molecule is selected from at least one of an acridine, an anthracene, an arylmethine, a cyanin, a coumarin, an oxacine, an oxadiazole, a naphthalene, a pyrene, a squaraine, a tetrapyrrole, a xanthene, a spirhodamine, or other common fluorescent, phosphorescent, long-lifetime luminescent, or chemiluminescent scaffolds, or derivatives thereof. In another aspect, the optical molecular switch molecule is attached to the medium. In another aspect, the medium is liquid, solid, a liquigel, organic, inorganic, thixotropic, a crystal, a glass, a gel, a polymer, a gas, and combinations thereof. In another aspect, the light sources are selected to match the wavelength of excitation of the optical molecular switch molecule. In another aspect, the optical molecular switch molecule is a protein. In another aspect, the optical molecular switch molecule is a green fluorescent protein, cyan fluorescent protein, yellow fluorescent protein, red fluorescent protein, gold fluorescent protein and combinations thereof. In another aspect, the optical molecular switch molecule is a saturation dye, an acceptor fluorophore, a donor fluorophore, and combinations thereof. In another aspect, the optical molecular switch molecule is capable of energy transfer selected from fluorescence resonance energy transfer (FRET), or fluorescence resonance energy transfer (FRET) with a molecular-beacon. In another aspect, at least three optical molecular switch molecules are selected to provide at least three different colors that provide for color images. In another aspect, the three dimensional image can be viewed without glasses or tricking the brain to appear three-dimensional. In another aspect, the three dimensional image is volumetric. In another aspect, the first, the second or both light sources are lasers. In one aspect, the optical molecular switch molecule is resuspended in a solvent or a base selected from at least one of dioxane, tetrahydrofuran, acetone, methanol, ethanol, isopropanol, water, diisopropyl ethylamine, pyridine, carbonate, or bicarbonate. In another aspect, each of the first light source or the second light source projects a three-dimensional images by rapid scanning of the first or second light source, and the other light source is synchronized with a changing patterned of light to form a three dimensional image in the medium. In another aspect, each of the first light source or the second light source displays a three-dimensional image by projecting light into a woven pattern into the medium. In another aspect, each of the first light source or the second light source displays a three-dimensional image by projecting light into a diagonal pattern into the medium. In another aspect, an agent that filters stray light is provided in the medium or a surface of a vessel that contains the medium. In another aspect, an angle formed between the light emitted from the first light source and the light emitted by the second light sources is at an angle other than 90 degrees. In another aspect, the first light source is a UV projector with a short pass filter, and the second light source uses a long pass filter before a camera. In another aspect, the short pass filter is a 395 nm filter, and the long pass filter is at least one of a 515, a 550, or a 590 nm filter.

In yet another embodiment, the present invention includes a non-transitory computer program product, which, when executed by a processor, causes the processor to: obtain from a memory a position in a first and a second dimension an image stored in the memory; and direct a first and a second light source (e.g., a laser or a digital light processor) into a medium based on the first and the second dimensions of the image stored in the memory, wherein the medium comprises an optical molecular switch molecule, wherein the optical molecular switch molecule has a non-fluorescent state and a fluorescent state, wherein at one wavelength of optical excitation the optical molecular switch molecule has a first state and at a second state the molecule fluoresces a second wavelength of excitation, and wherein the first and the second light sources are directed into the medium to convert the optical molecular switch molecule into a fluorescent "on state" by irradiation from the first light source, and when the second light source irradiates the optical molecular switch molecule in the "on state" the optical molecular switch molecule emits light at a specific location in the medium. In one aspect, when the first and the second light source intersect the optical molecular switch molecule excites and releases light. In another aspect, the first or the second light source is a pulsed laser thereby to produce an improved voxel to background emission. In another aspect, the first and the second light source scan across the medium, wherein the optical molecular switch molecule that excite and emit light in the medium create the three dimensional image. In another aspect, the molecule is selected from at least one of an acridine, an anthracene, an arylmethine, a cyanin, a coumarin, an oxacine, an oxadiazole, a naphthalene, a pyrene, a squaraine, a tetrapyrrole, a xanthene, a spirhodamine, or other common fluorescent, phosphorescent, long-lifetime luminescent, or chemiluminescent scaffolds, or derivatives thereof. In another aspect, the optical molecular switch molecule is attached to the medium. In another aspect, the medium is liquid, solid, a liquigel, organic, inorganic, thixotropic, a crystal, a glass, a gel, a polymer, a gas, and combinations thereof. In another aspect, the light sources are selected to match the wavelength of excitation of the optical molecular switch molecule. In another aspect, the optical molecular switch molecule is a protein. In another aspect, the optical molecular switch molecule is a green fluorescent protein, cyan fluorescent protein, yellow fluorescent protein, red fluorescent protein, gold fluorescent protein and combinations thereof. In another aspect, the optical molecular switch molecule is a saturation dye, an acceptor fluorophore, a donor fluorophore, and combinations thereof. In another aspect, the optical molecular switch molecule is capable of energy transfer selected from fluorescence resonance energy transfer (FRET), or fluorescence resonance energy transfer (FRET) with a molecular-beacon. In another aspect, at least three optical molecular switch molecules are selected to provide at least three different colors that provide for color images. In another aspect, the three dimensional image can be viewed without glasses or tricking the brain to appear three-dimensional. In another aspect, the three dimensional image is volumetric. In another aspect, the first, the second or both light sources are lasers. In one aspect, the optical molecular switch molecule is resuspended in a solvent or a base selected from at least one of dioxane, tetrahydrofuran, acetone, methanol, ethanol, isopropanol, water, diisopropyl ethylamine, pyridine, carbonate, or bicarbonate. In another aspect, each of the first light source or the second light source projects a three-dimensional images by rapid scanning of the first or second light source, and the other light source is synchronized with a changing patterned of light to form a three dimensional image in the medium. In another aspect, each of the first light source or the second light source displays a three-dimensional image by projecting light into a woven pattern into the medium. In another aspect, each of the first light source or the second light source displays a three-dimensional image by projecting light into a diagonal pattern into the medium. In another aspect, an agent that filters stray light is provided in the medium or a surface of a vessel that contains the medium. In another aspect, an angle formed between the light emitted from the first light source and the light emitted by the second light sources is at an angle other than 90 degrees. The skilled artisan will recognize that by tilting the light source it allows image construction in two or three dimensions. In another aspect, the first light source is a UV projector with a short pass filter, and the second light source uses a long pass filter before a camera. In another aspect, the short pass filter is a 395 nm filter, and the long pass filter is at least one of a 515, a 550, or a 590 nm filter.

BRIEF DESCRIPTION OF THE DRAWINGS

For a more complete understanding of the features and advantages of the present invention, reference is now made to the detailed description of the invention along with the accompanying figures and in which:

In FIG. 2A, a red voxel is displayed at the intersection of the two laser beams. In FIG. 2B the voxel can be moved by changing the point of intersection of the two beams, establishing the foundation for three-dimensional image creation.

In FIG. 3A a red voxel is displayed at the intersection of the two laser beams after a pulse with the 405 nm laser pointer. In FIG. 3B the voxel can be moved by changing the point of intersection of the two beams, establishing the foundation for three-dimensional image creation.

FIG. 11A shows the image projected from the RGB projector. FIG. 11B shows the image projected from the UV projector. FIG. 11C shows the three-dimensional image, a heart in the middle of the image chamber, where the green and UV patterned light intersects.

FIG. 12A shows the image projected from the RGB projector. FIG. 12B shows the image projected from the UV projector. FIG. 12C shows the three-dimensional image, a pyramid, where the green and UV patterned light intersects.

DETAILED DESCRIPTION OF THE INVENTION

Figure 1:
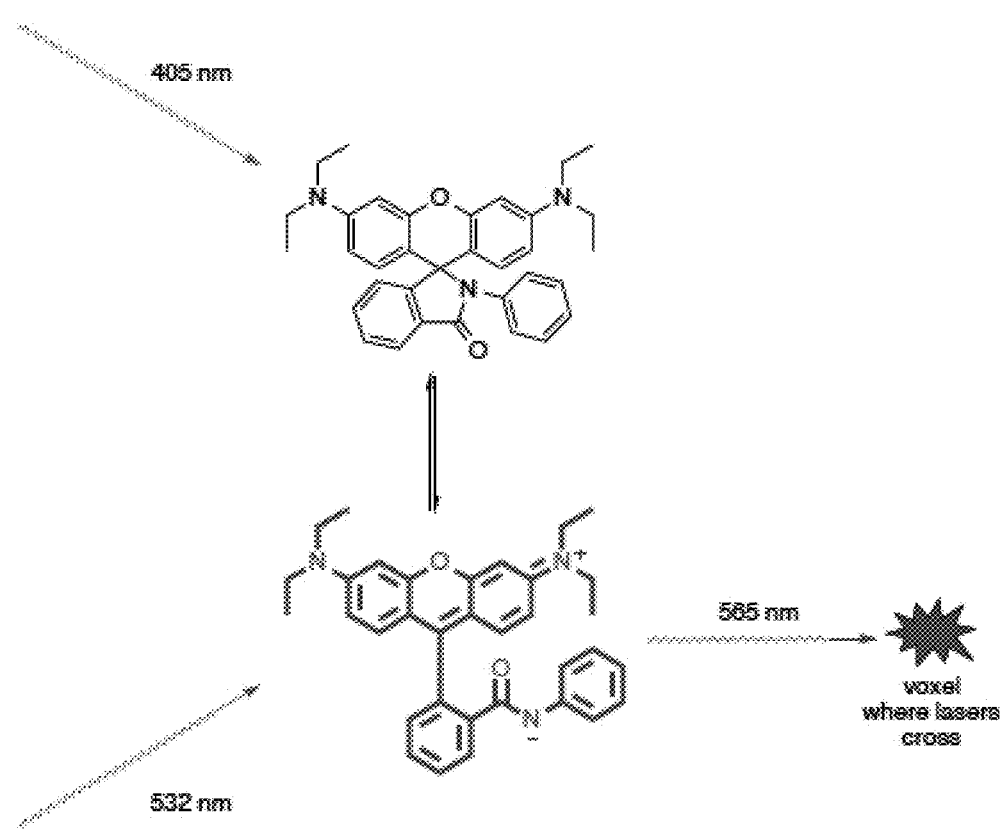
FIG. 1 shows a diagram of a system and method for a three-dimensional optical switch display of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Traditional three-dimensional (3D) stereoscopic displays (i.e., including 3D glasses or holography) do not produce 'true' 3D images, relying instead on 'tricking' the brain into a 3D appearance. Truly 3D images, however, can be generated by a volumetric display, a device that forms a visual representation of an object in three physical dimensions, as opposed to a planar image on traditional screens that simulate depth through a number of different visual effects. Unique properties of volumetric displays include 360-degree viewing, agreement of converge and accommodation cues and their inherent 3D format, also enabling innovative user-interface techniques. However, current volumetric displays have several major disadvantages including complexity and cost. For example, volumetric imaging systems generally require: laser scanner hardware, relatively high power lasers (or bulky light source arrays) for excitation processes and/or advanced materials (e.g. plasma emission) and a variety of moving parts, lenses, mirrors and the like. These requirements contribute to the cost of such systems, making its wide commercial implementation impractical.

Known volumetric display technologies also have several drawbacks including: a failure to represent occlusion and opacity, and 3D-scene distortion when viewed from non-predicted locations. Additional drawbacks include a large amount of bandwidth or throughput required to feed images into a high-resolution volumetric display. Thus, a need remains for improved and/or low-cost volumetric displays.

The present invention addresses these key problems with current volumetric displays, and may be used in a wide range of applications in different sectors, including but not limited to, medical, aerospace and defense, automotive, and industrial. Further, higher availability and lower-cost 3D displays will find wider applications in biomedical imaging, scientific and industrial image rendering, entertainment and communication.

The disclosed invention includes a system and method for a volumetric three-dimensional optical switch display (OSD) device. A low cost three-dimensional display has enormous commercial potential not only in the entertainment industry, but also for biomedical imaging, scientific and industrial image rendering, and communication applications. Traditional three-dimensional displays, including stereoscopic (i.e. 3D glasses) or holography are not true three-dimensional images and rely on tricking the eyes and the brain to "appear" three-dimensional.

The system and method of the present invention generates truly three-dimensional volumetric images. While volumetric imaging systems have been reported in prior art, they generally require moving parts, high power lasers for upconversion processes, bulky light source arrays, or advanced metamaterials. These limitations all contribute to the expense of such systems as well as making large-scale implementation impractical. The present invention enables the generation of voxels (three dimensional pixels) using small organic molecules called "optical switches" and two lasers of appropriate wavelengths.

One example of the present invention relies on a newly conceived optical switch display technology. An optical switch is an organic molecule that can change its shape and properties in response to irradiation with an appropriately tuned light source. In our invention, we utilize optical switches that transform from a non-fluorescent "off state" into a fluorescent "on state" upon irradiation with one wavelength of light. In the "on state", the optical switch can be made to fluoresce by irradiation with a second light source of the appropriate wavelength. If the optical switch is properly designed, it will quickly relax back to the "off state" and no longer fluoresce. When dispersed in solution or in a transparent polymeric matrix (i.e. a three-dimensional "screen"), a voxel of light appears only where the two light sources cross.

Figures 2A, 2B:
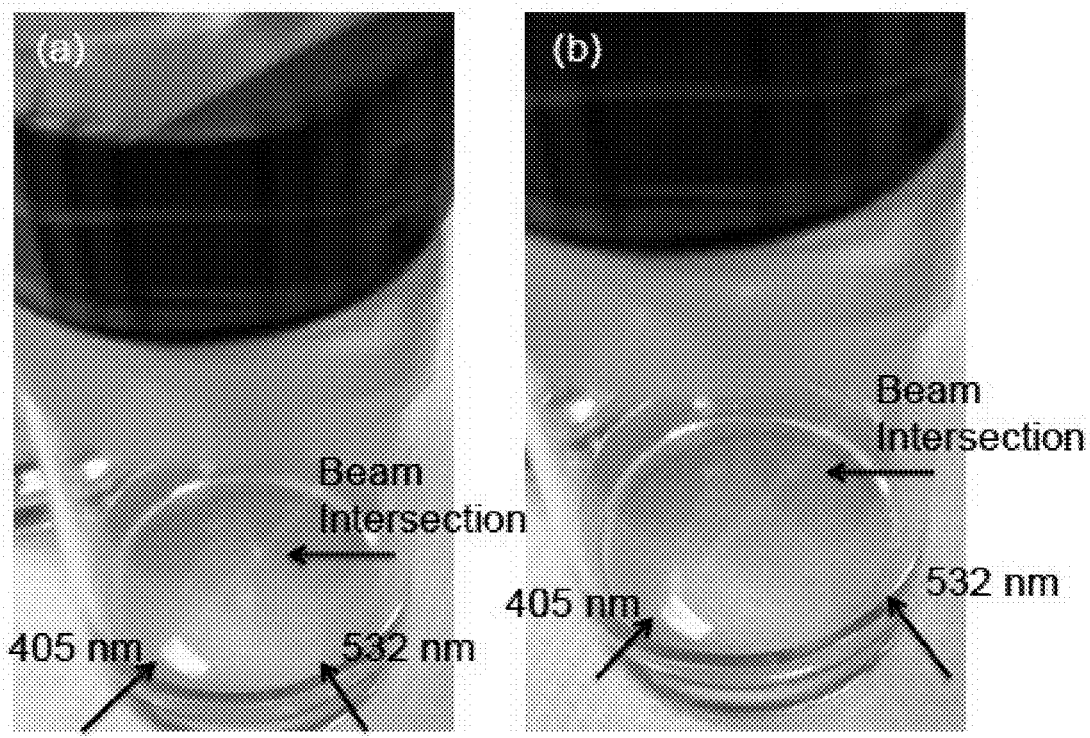
FIGS. 2A and 2B show voxel formation using a solution of a spirolactam rhodamine optical switch and purple (405 nm) and green (532 nm) laser pointers.

In one embodiment (FIG. 1), a spirolactam rhodamine optical switch can be switched to the fluorescent "on state" using a low power 5 mW 405 nm laser (i.e. a purple laser pointer). Without 405 nm irradiation, the spirolactam rhodamine optical switch rapidly relaxes back to the nonfluorescent "off state". While receiving continuous 405 nm irradiation to keep the optical switch in the "on state", it will fluoresce with an emission maximum of 565 nm (red) upon irradiation with a low power 5 mW 532 nm laser (i.e. a green laser pointer). The net result is that a solution of the spirolactam rhodamine optical switch will display a three-dimensional voxel of light only where the two lasers intersect. In one embodiment (FIGS. 2A and 2B), the 405 nm and 532 nm lasers are simultaneously aimed into a solution of the spirolactam rhodamine optical switch, and a voxel of light is seen at the intersection of the beams (FIG. 2A). A low background trace of the laser beams can be seen where they do not intersect, an issue that will be fixed by optimization of the optical switch chemistry and/or use of appropriate band-pass filters. The lasers are moved in FIG. 2B, demonstrating the ability to manipulate the three-dimensional voxel. This design establishes the foundation for laser scanning to be used to generate full three-dimensional images.

Figure 3A:
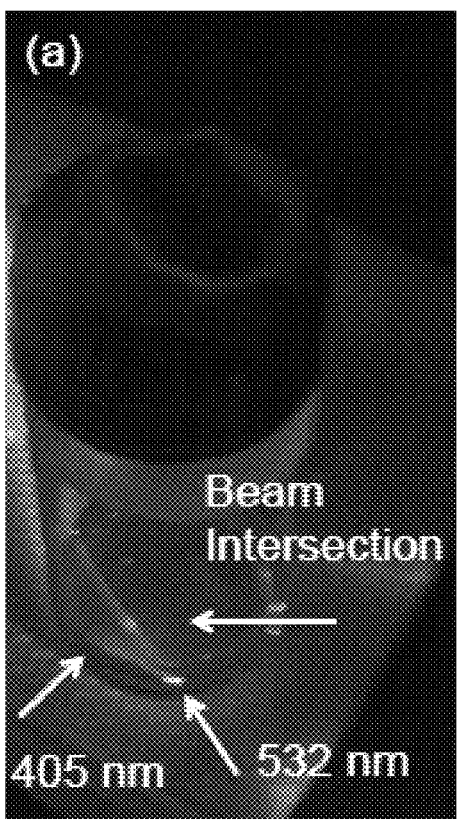
FIGS. 3A and 3B show a pulsed method for decreasing background during voxel formation using a solution of a spirolactam rhodamine optical switch and a purple (405 nm) and green (532 nm) laser pointer.
Figure 3B:
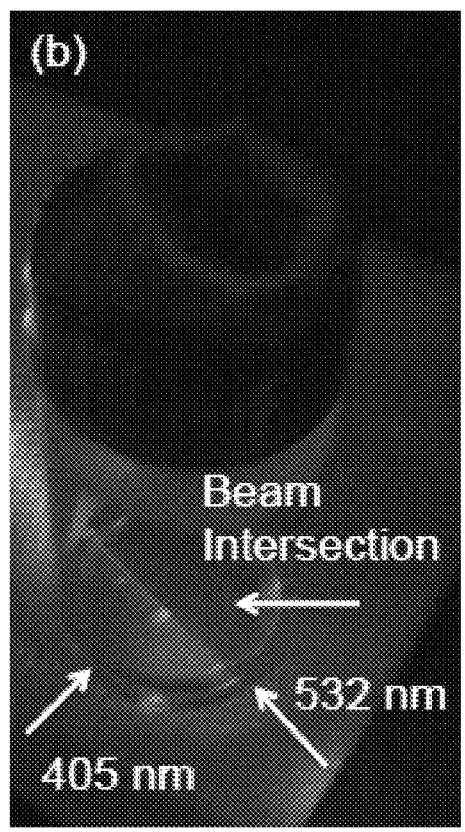

In a second embodiment, increased voxel to background emission is accomplished using a pulsed laser method. Using a spirolactam rhodamine optical switch where the relaxation from the fluorescent "on state" to the non-fluorescent "off state" is on the time scale of seconds enables a system where the 405 nm laser can first be pulsed to induce the spirolactam rhodamine optical switch into the fluorescent "on state" in the path of the beam. The 405 nm laser can then be removed and the spirolactam rhodamine optical switch will remain in the fluorescent "on state" for several seconds. Irradiation with the 532 nm laser induces fluorescence only where it crosses along the path of the previous 405 nm irradiation (FIG. 3A). The pulse can be repeated at a different location to produce a voxel at a different location (FIG. 3B). The precise kinetics and optics can be tuned to provide a system amenable to laser scanning and low cost three-dimensional displays.

Figure 4:
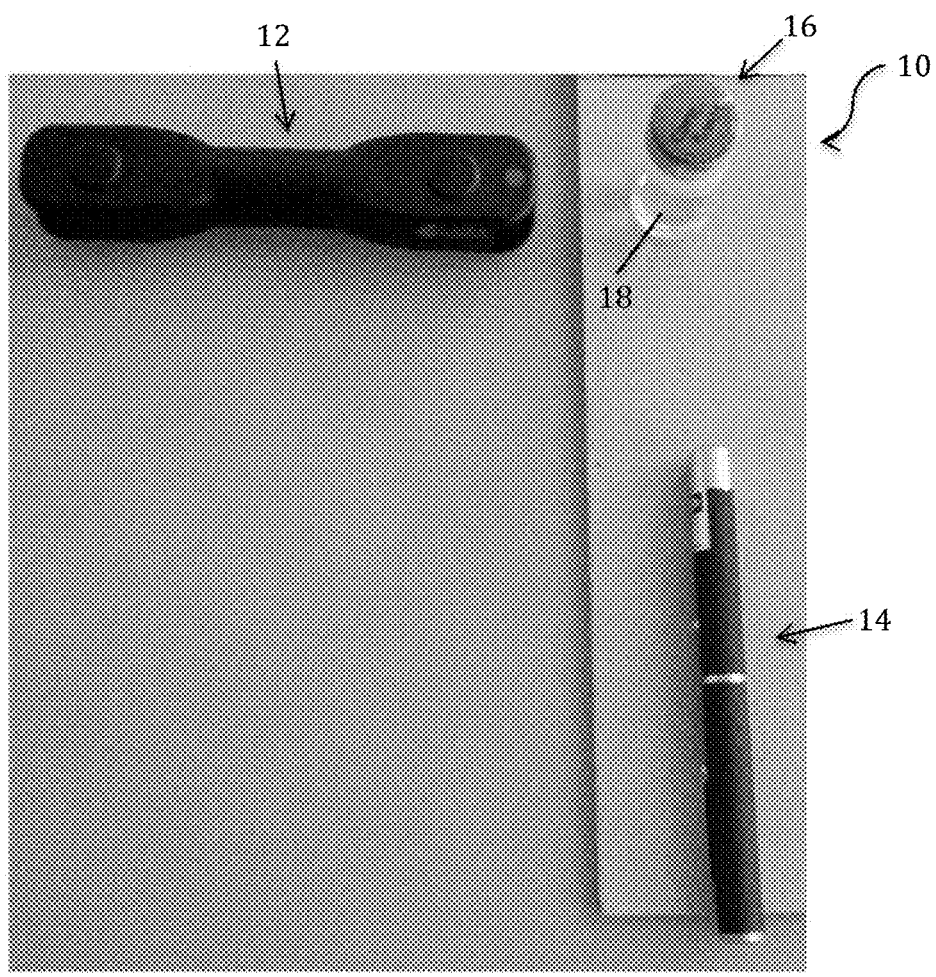
FIG. 4 shows an example of a set-up of the present invention.

FIG. 4 shows an example of a set-up of the present invention. The volumetric display system 10, is depicted showing the positioning of a first light source 12, and a second light source 14, directed at a vial 16, which contains the medium 18. As described hereinabove, the results of using the invention, as shown in FIGS. 2A, 2B, 3A and 3B are shown in medium 18.

Figure 5:
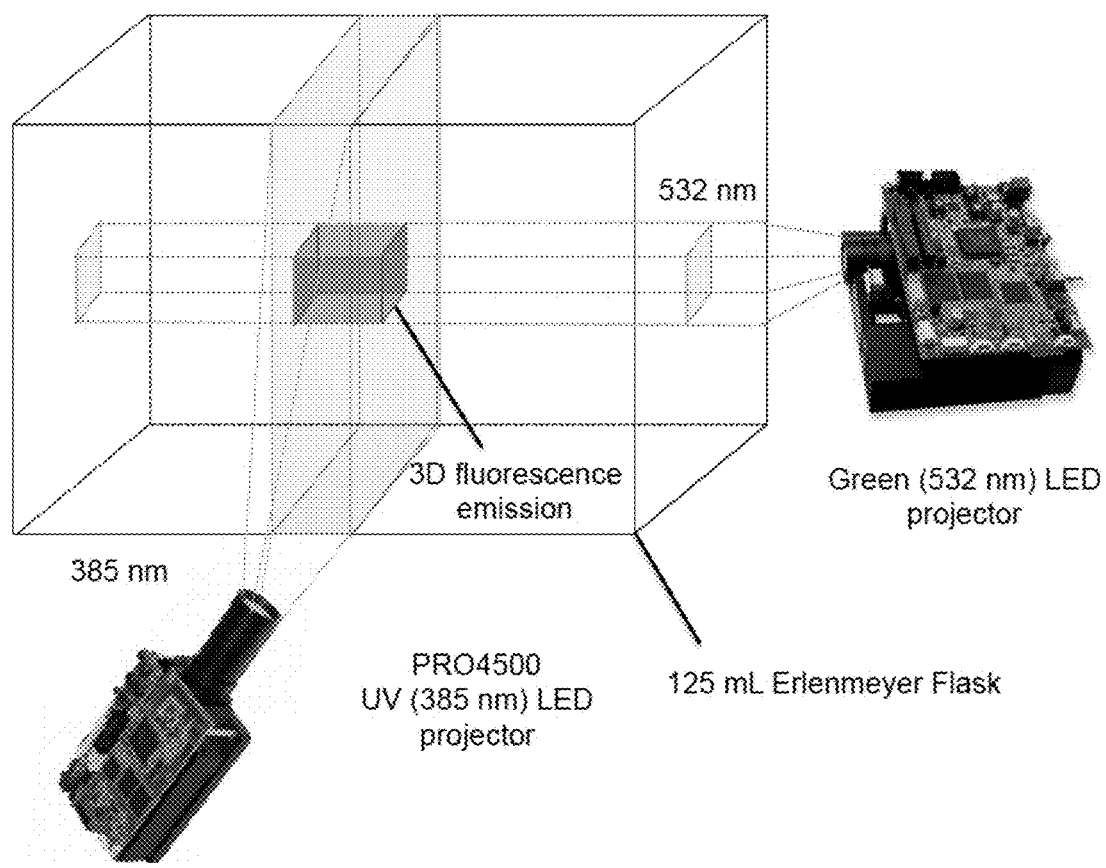
FIG. 5 shows a dual Digital Light Processor (DLP) projection system is used to display three-dimensional images (FIG. 5).
Figure 6:
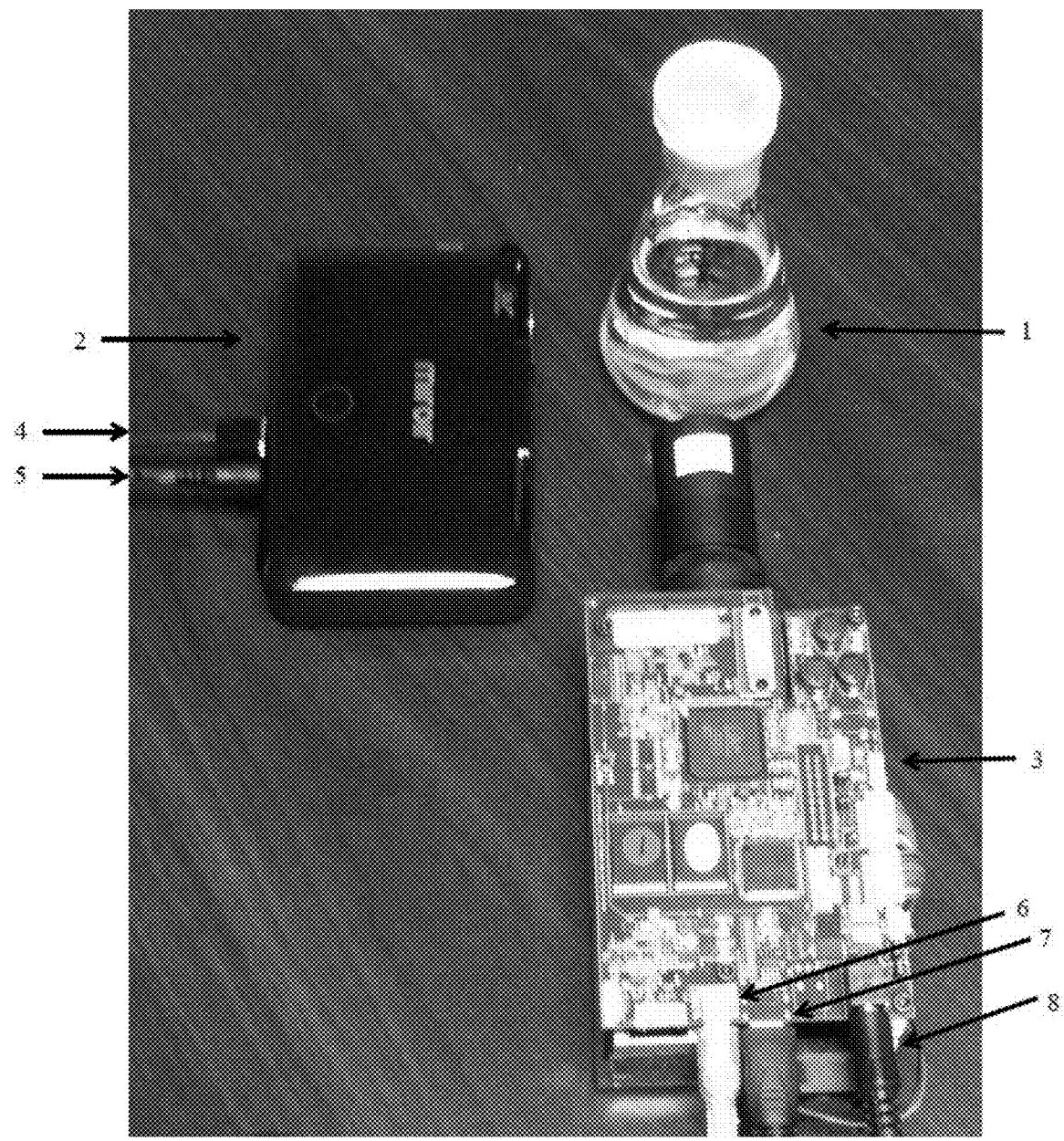
FIG. 6 shows a custom-DLP projector 3 (Wintech) equipped with a 385 nm LED and a Miroir HD 720p picoprojector 2 equipped with RGB LEDs irradiates the small molecule optical switch solution (1) plus chemical additives to fine-tune the switching properties.
Figure 7A:
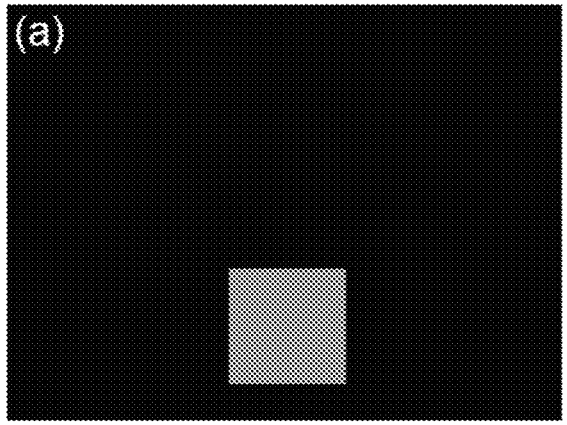
FIG. 7A shows the image projected from the RGB projector.
Figure 7B:
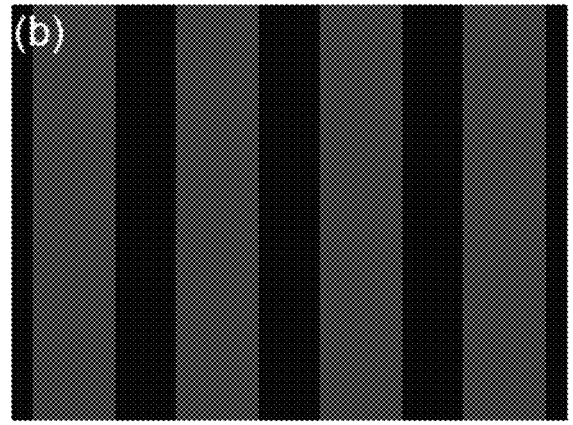
FIG. 7B shows the image projected from the UV projector.
Figure 7C:
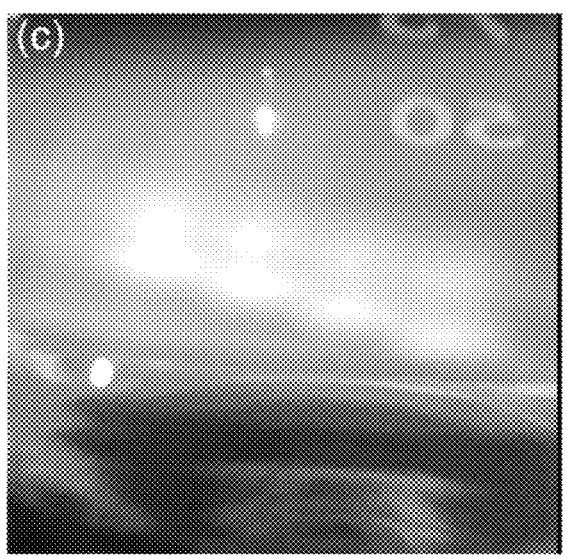
FIG. 7C shows the three-dimensional image, a row of squares, where the green and UV patterned light intersects.
Figure 7D:
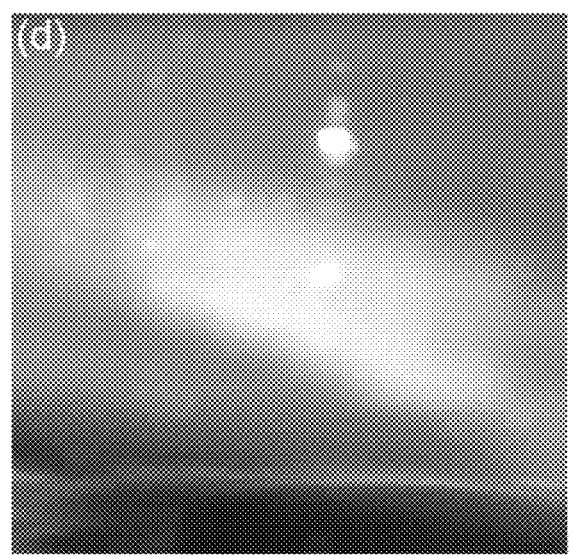
FIG. 7D is the same image in FIG. 7C, but viewed at a different angle.
Figure 8A:
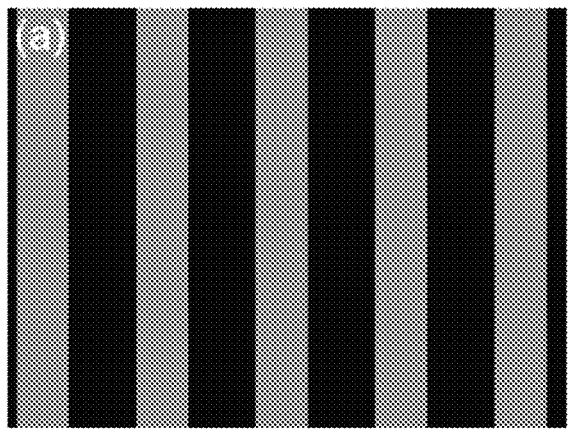
FIG. 8A shows the image projected from the RGB projector.
Figure 8B:
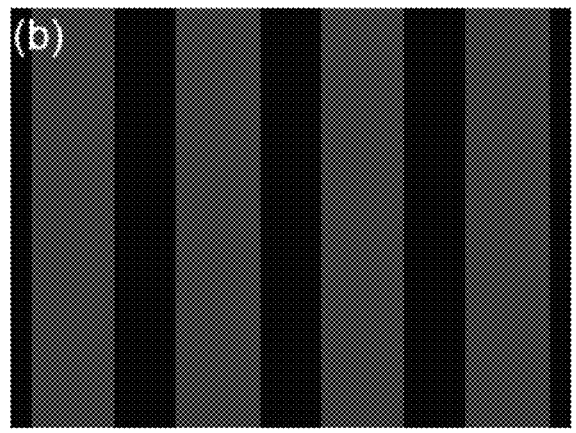
FIG. 8B shows the image projected from the UV projector.
Figure 8C:
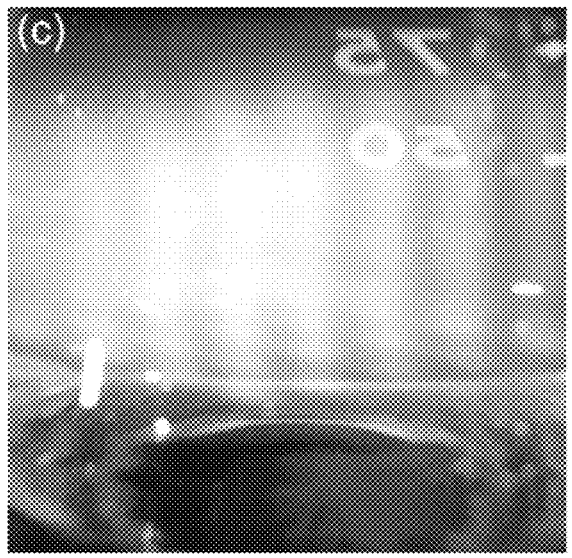
FIG. 8C shows the three-dimensional image, a 5×4 grid of bars, where the green and UV patterned light intersects.
Figure 8D:
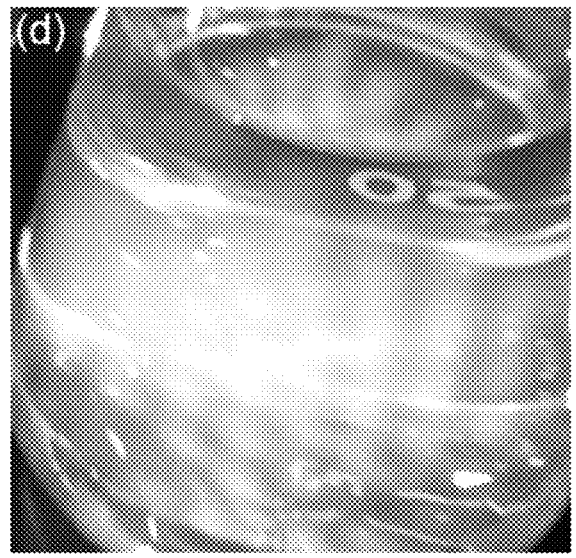
FIG. 8D is the same image in FIG. 8C, but viewed at a different angle.

In a third embodiment, a dual Digital Light Processor (DLP) projection system is used to display three-dimensional images (FIG. 5). As shown in FIG. 6, a custom-DLP projector 3 (Wintech) equipped with a 385 nm LED and a Miroir HD 720p picoprojector 2 equipped with RGB LEDs irradiates the small molecule optical switch solution 1 plus chemical additives to fine-tune the switching properties. FIG. 6 also shows that the Miroir HD 720p picoprojector 2 includes an HDMI connector 4, and power supply 5. The custom-DLP projector 3 includes a USB connector 6, an HDMI connector 7, and a power supply 8. At the intersection of the patterned light red fluorescence will be observed, generating a volumetric display in three-dimensional space.

Figure 9A:
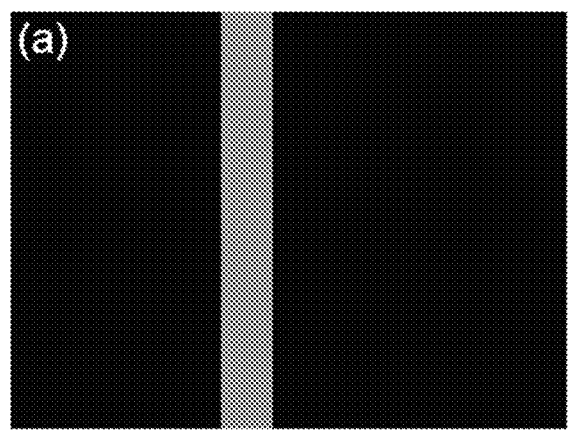
FIG. 9A shows the image projected from the RGB projector.
Figure 9B:
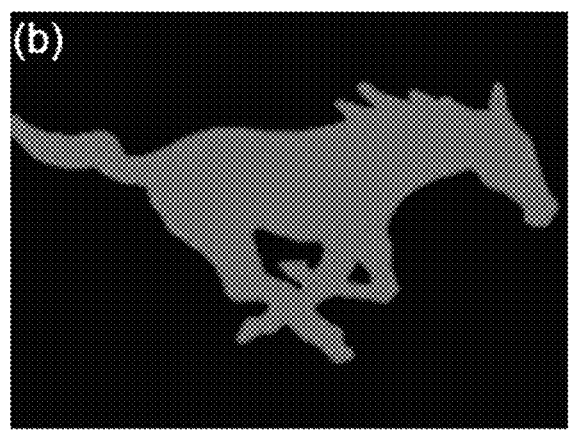
FIG. 9B shows the image projected from the UV projector.
Figure 9C:
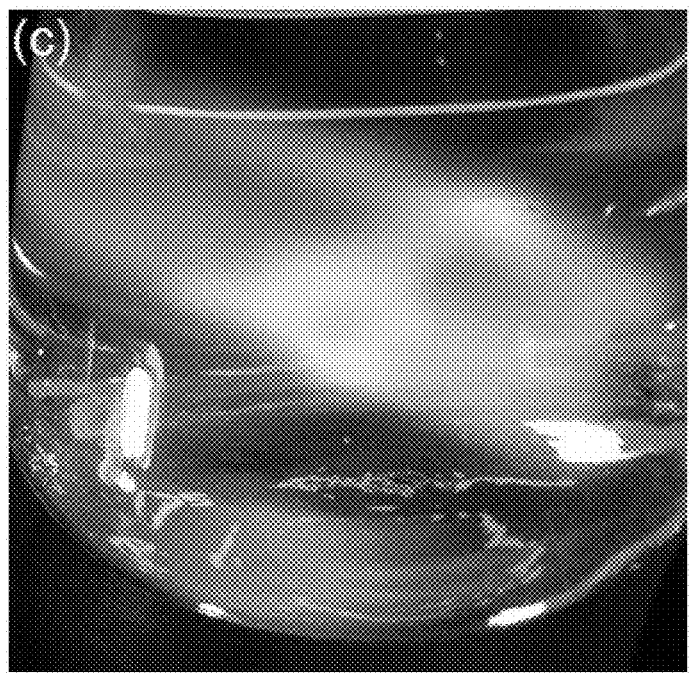
FIG. 9C shows the three-dimensional image, the SMU Mustang logo, where the green and UV patterned light intersects.

Three example of images generated using the set-up of FIG. 6 are shown in FIGS. 7-9 using 5 mM N-Phenyl Spirhodamine in dichloromethane containing 0.0001% triethylamine. Other solvents and bases can be used including, but not limited to dioxane, tetrahydrofuran, acetone, methanol, ethanol, isopropanol, water, diisopropyl ethylamine, pyridine, carbonate, bicarbonate, etc. FIG. 7A shows the image projected from the RGB projector. FIG. 7B shows the image projected from the UV projector. FIG. 7C shows the three-dimensional image, a row of squares, where the green and UV patterned light intersects. FIG. 7D is the same image in FIG. 6C, but viewed at a different angle. In a second example, FIG. 8A shows the image projected from the RGB projector. FIG. 8B shows the image projected from the UV projector. FIG. 8C shows the three-dimensional image, a 5×4 grid of bars, where the green and UV patterned light intersects. FIG. 8C is the same image in FIG. 8C, but viewed at a different angle. In a third example, FIG. 9A shows the image projected from the RGB projector. FIG. 9B shows the image projected from the UV projector. Note that the UV projector outputs 385 nm light, even though the input is a red image. FIG. 9C shows the three-dimensional image, the SMU Mustang logo, where the green and UV patterned light intersects.

Figure 10A:
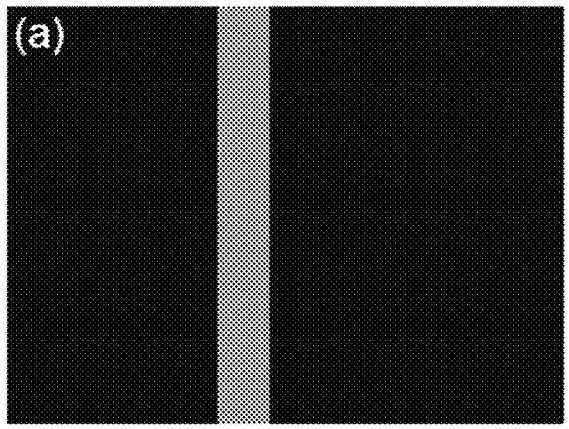
FIG. 10A shows the image projected from the RGB projector.
Figure 10B:
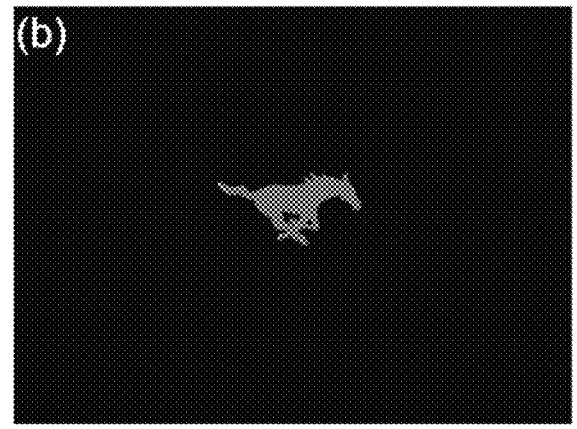
FIG. 10B shows the image projected from the UV projector.
Figure 10C:
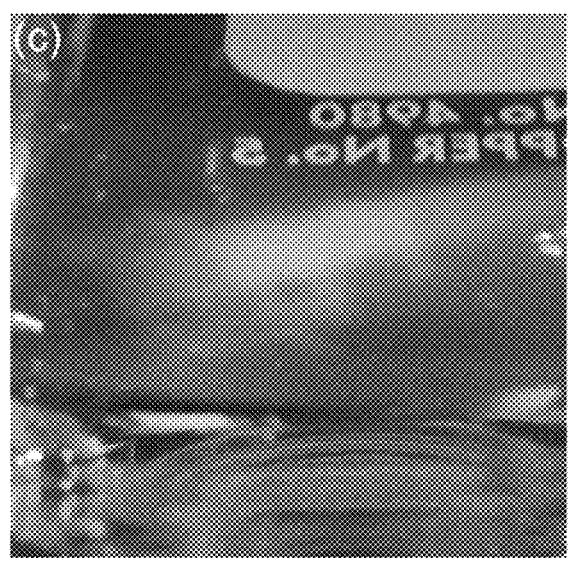
FIG. 10C shows the three-dimensional image, the SMU Mustang logo, where the green and UV patterned light intersects.
Figure 13A:
FIG. 13A shows the image projected from the RGB projector.
Figure 13B:
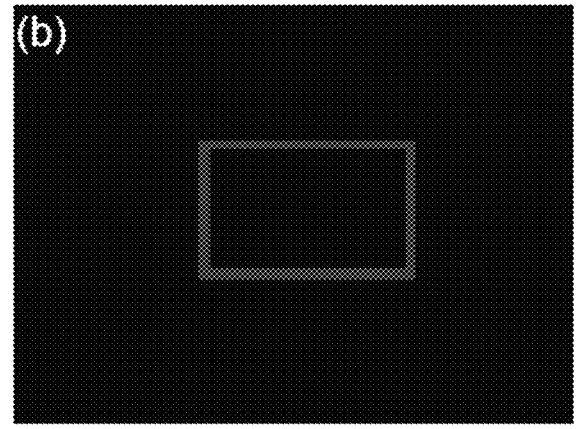
FIG. 13B shows the image projected from the UV projector.
Figure 13C:
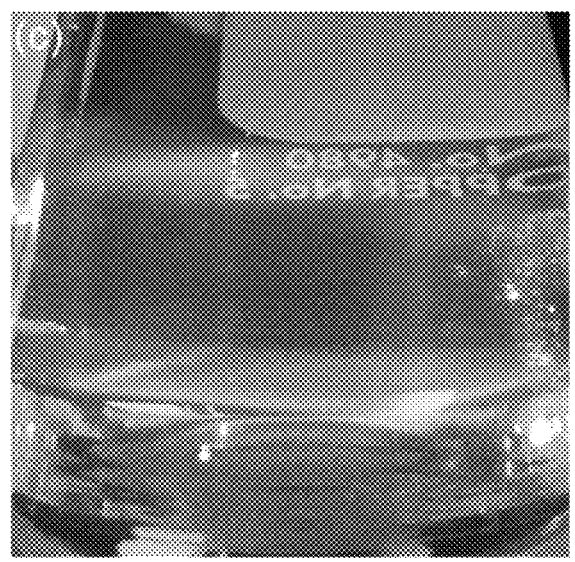
FIG. 13C shows the three-dimensional image, a rectangular prism, where the green and UV patterned light intersects.

In a fourth embodiment, a dual Digital Light Processor (DLP) projection system is used to display three-dimensional images in combination with an optical filter to remove unwanted blue light, increasing resolution and contrast. A custom-DLP projector (Wintech) equipped with a 385 nm LED and a Miroir HD 720p picoprojector equipped with RGB LEDs will irradiate the small molecule optical switch solution plus chemical additives to fine-tune the switching properties. At the intersection of the patterned light red fluorescence will be observed, generating a volumetric display in three-dimensional space. Four example images are shown in FIGS. 10-13. FIG. 10A shows the image projected from the RGB projector. FIG. 10B shows the image projected from the UV projector. FIG. 10C shows the three-dimensional image, the SMU Mustang logo, where the green and UV patterned light intersects. In a second example, FIG. 11A shows the image projected from the RGB projector. FIG. 11B shows the image projected from the UV projector. FIG. 11C shows the three-dimensional image, a heart in the middle of the image chamber, where the green and UV patterned light intersects. In a third example, FIG. 12A shows the image projected from the RGB projector. FIG. 12B shows the image projected from the UV projector. FIG. 12C shows the three-dimensional image, a pyramid, where the green and UV patterned light intersects. In a fourth example, FIG. 13A shows the image projected from the RGB projector. FIG. 13B shows the image projected from the UV projector. FIG. 13C shows the three-dimensional image, a rectangular prism, where the green and UV patterned light intersects.

Figure 14:
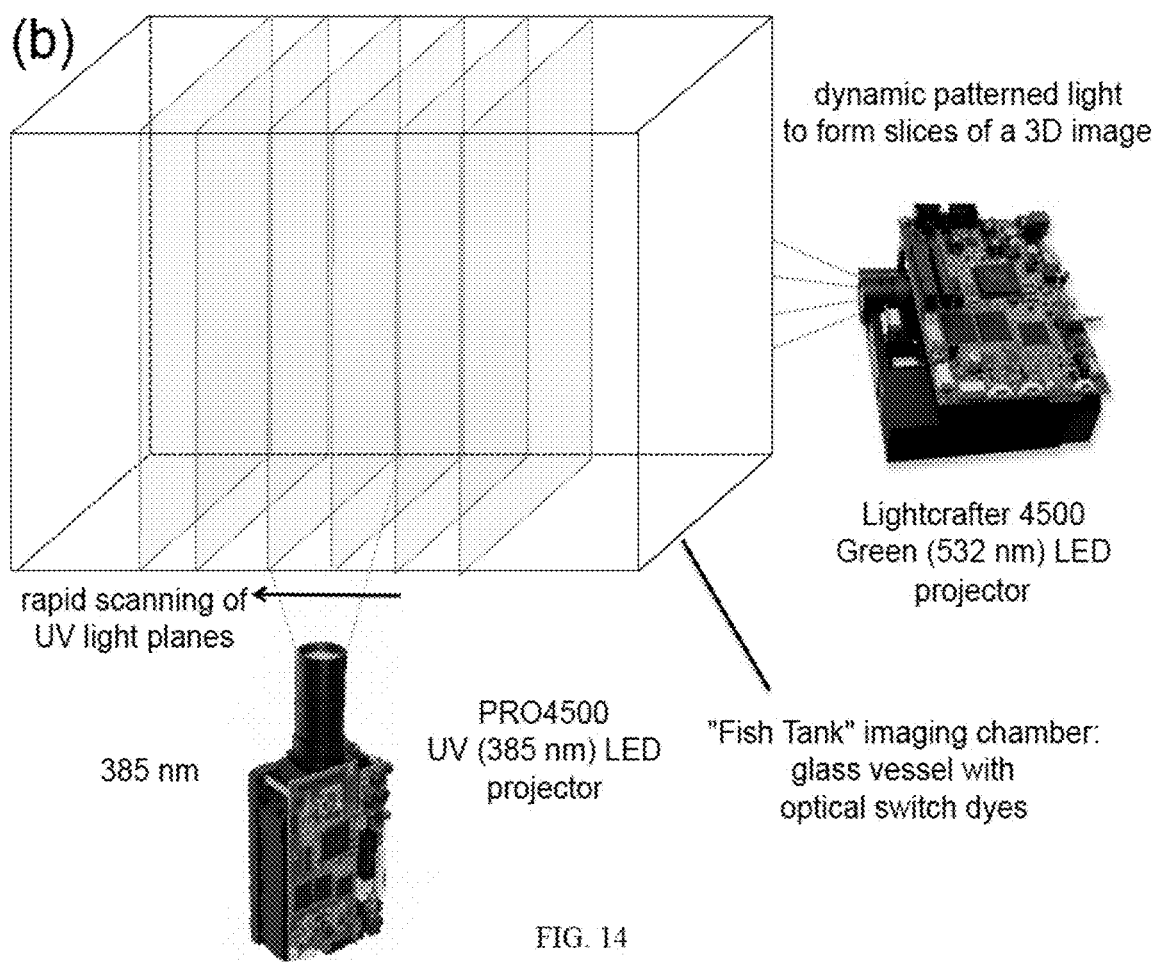
FIG. 14 shows a dual Digital Light Processor (DLP) projection system is used to display arbitrary three-dimensional images by rapid scanning of UV planes of light synchronized with a changing patterned light from the RGB projector (FIG. 14).

In a fifth embodiment, a dual Digital Light Processor (DLP) projection system is used to display arbitrary three-dimensional images by rapid scanning of UV planes of light synchronized with a changing patterned light from the RGB projector (FIG. 14). Supplementary Movie 1 shows the movie projected from the RGB projector. Supplementary Movie 2 shows the movie projected from the UV projector. Supplementary Movie 3 shows the three dimensional image, cross-sections of a sphere. Rapid scanning and proper phasing will provide a method for arbitrary three-dimensional image generation.

Figure 15A:
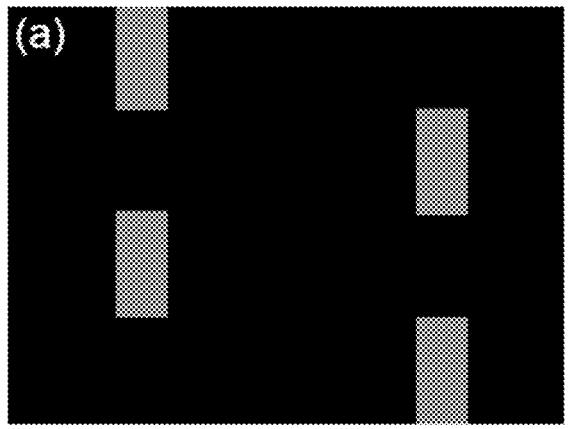
FIG. 15A shows the image projected from the RGB projector, a four-fold gridded pattern of green light.
Figure 15B:
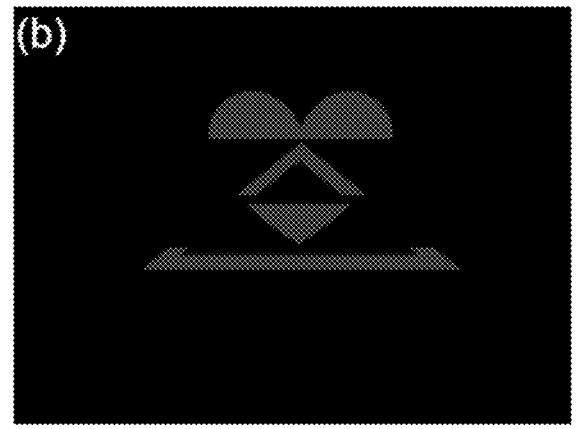
FIG. 15B shows the image projected from the UV projector, an interwoven pattern of two images.
Figure 15C:
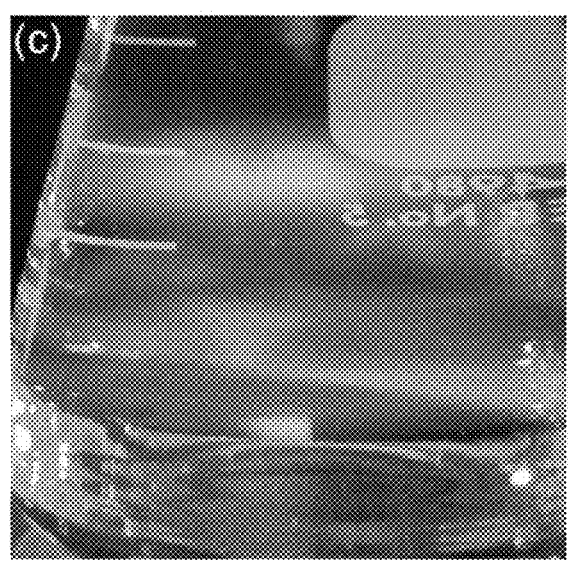
FIG. 15C shows the three-dimensional image, a heart in front of a triangle, where the green and UV patterned light intersects.
Figure 16A:
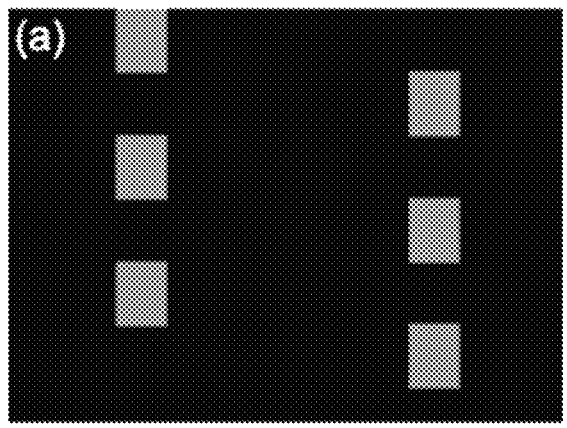
FIG. 16A shows the image projected from the RGB projector, a six-fold gridded pattern of green light.
Figure 16B:
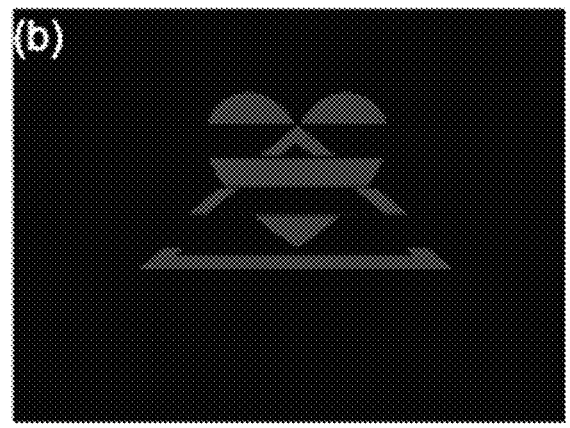
FIG. 16B shows the image projected from the UV projector, an interwoven pattern of two images.
Figure 16C:
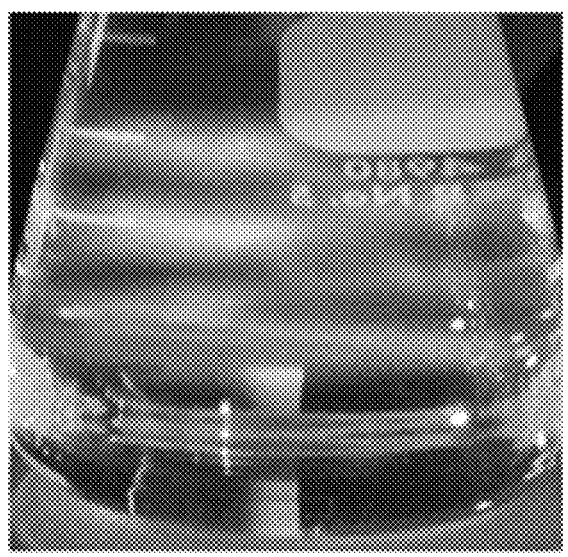
FIG. 16C shows the three-dimensional image, a heart in front of a triangle, where the green and UV patterned light intersects.
Figure 17A:
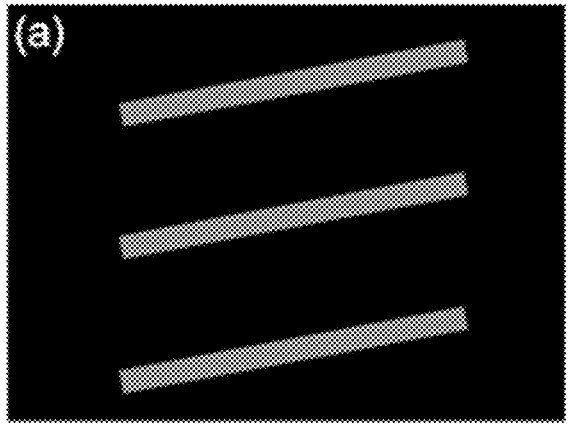
FIG. 17A shows the image projected from the RGB projector, a series of diagonal lines.
Figure 17B:
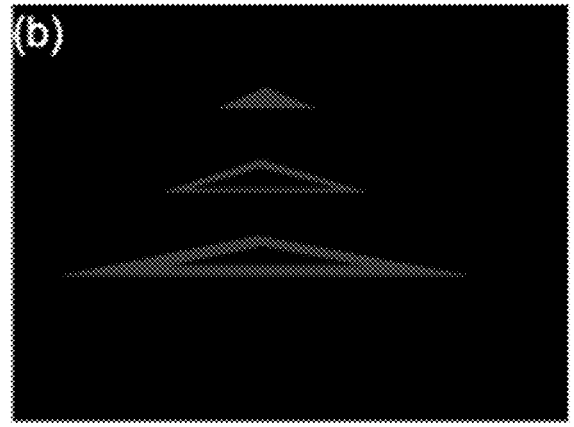
FIG. 17B shows the image projected from the UV projector, three distorted triangle that when projected onto the diagonal green lines will form triangular cross-sections.
Figure 17C:
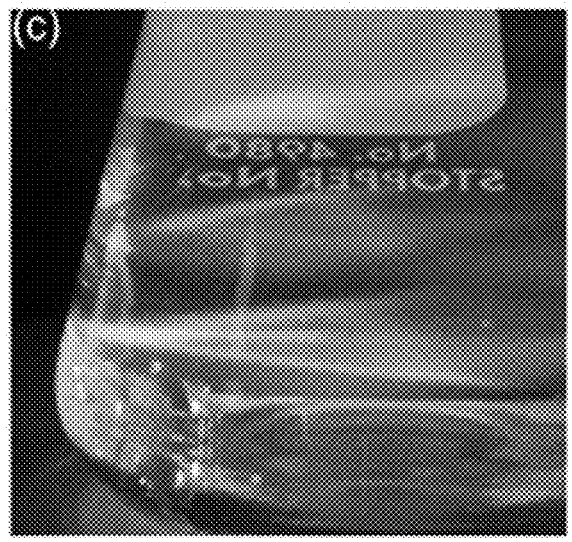
FIG. 17C shows the three-dimensional image, three triangles stacked atop each other.

In a sixth embodiment, a dual Digital Light Processor (DLP) projection system is used to display arbitrary three-dimensional images by projecting light into a woven pattern with UV and green light intersecting at points defined along the height of the imaging chamber. Three examples are shown in FIGS. 15-17. FIG. 15A shows the image projected from the RGB projector, a four-fold gridded pattern of green light. FIG. 15B shows the image projected from the UV projector, an interwoven pattern of two images. FIG. 15C shows the three-dimensional image, a heart in front of a triangle, where the green and UV patterned light intersects. Note that the heart sections intersect with one gridded plane of green light and the triangle sections intersect with a different gridded plan of green light. In a second example, FIG. 16A shows the image projected from the RGB projector, a six-fold gridded pattern of green light. FIG. 16B shows the image projected from the UV projector, an interwoven pattern of two images. FIG. 16C shows the three-dimensional image, a heart in front of a triangle, where the green and UV patterned light intersects. Note that the heart sections intersect with one gridded plane of green light and the triangle sections intersect with a different gridded plan of green light. In a third example, FIG. 17A shows the image projected from the RGB projector, a series of diagonal lines. FIG. 17B shows the image projected from the UV projector, three distorted triangle that when projected onto the diagonal green lines will form triangular cross-sections. FIG. 17C shows the three-dimensional image, three triangles stacked atop each other.

Figure 18:
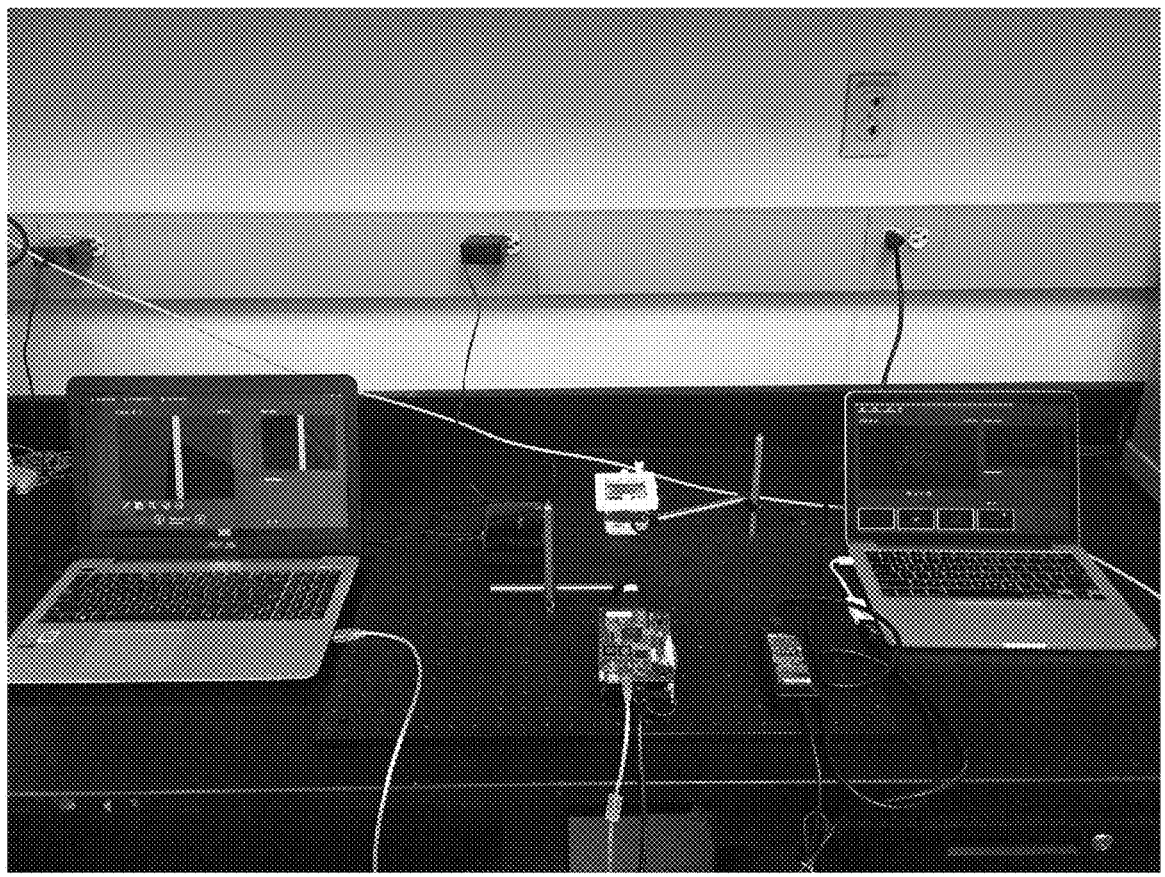
FIGS. 18 and 19 show images projected using a dual Digital Light Processor (DLP) projection system to display three-dimensional images using a 395 nm short pass filter in front of the UV projector and a 515 nm, 550 nm, or 590 nm long pass filter in front of the camera (FIG. 18, 19).
Figure 19:
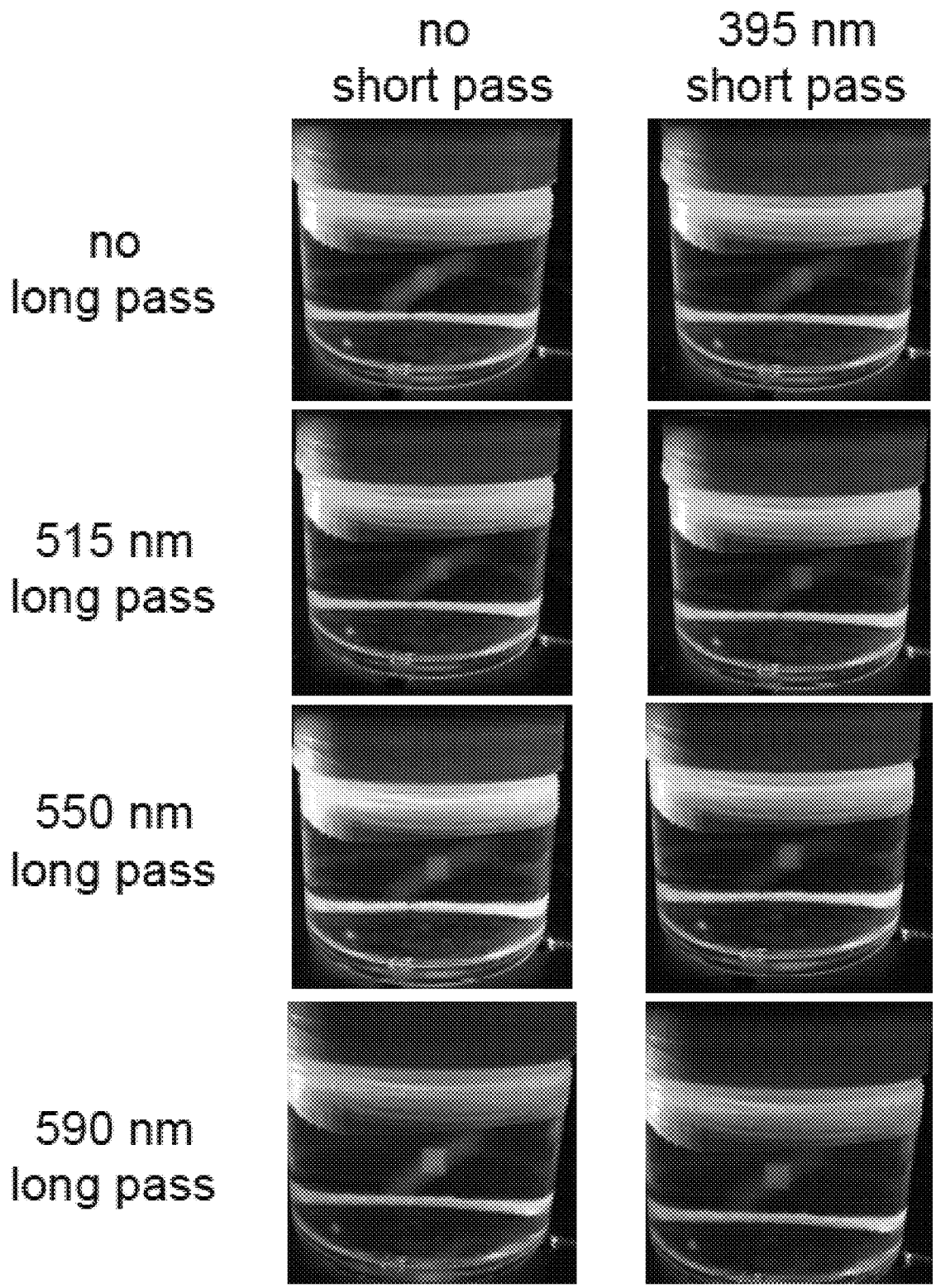
Figure 20A:
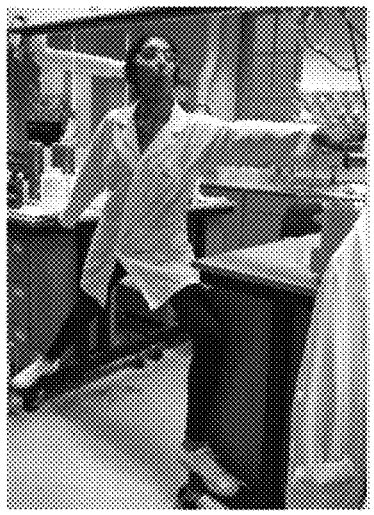
FIGS. 20A and 20B show images with optimization of imaging distances, which enables high-resolution images of the subjects.
Figure 20A:
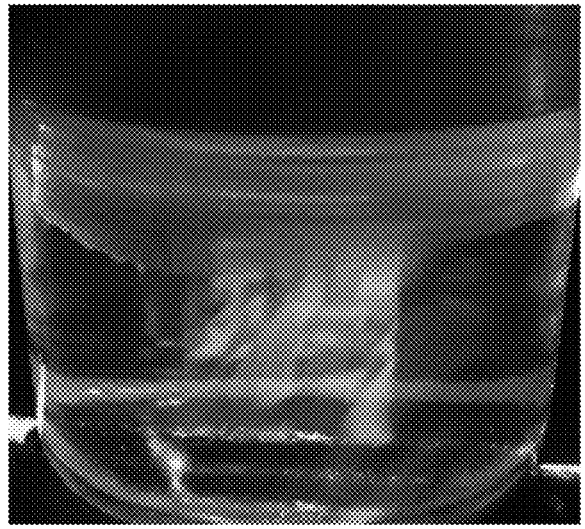
Figure 20B:
Figure 20B:
Figure 21A:
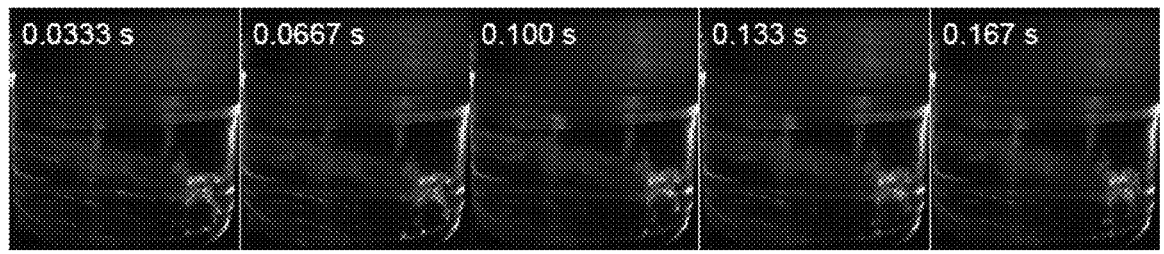
FIGS. 21A, 21B and 21C shows a progression of images in an animation at 30 fps at the listed times, the college mascot at the bottom right can be seen running.
Figure 21B:
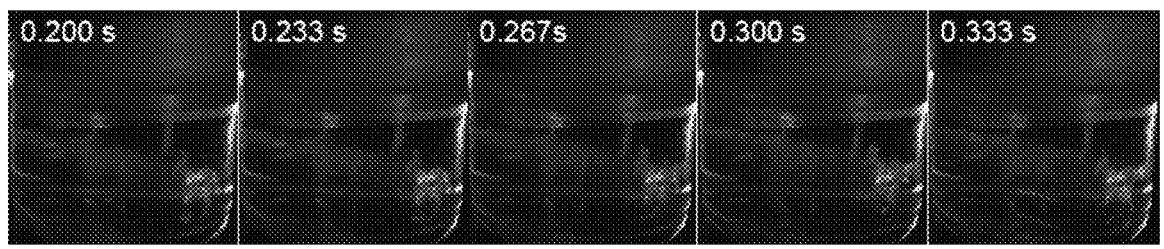
Figure 21C:
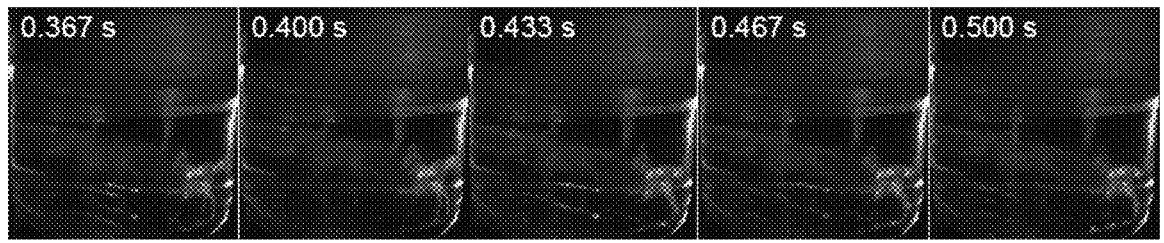

FIGS. 18-21 show yet another aspect of the present invention. In FIGS. 18 and 19, a dual Digital Light Processor (DLP) projection system is used to display three-dimensional images using a 395 nm short pass filter in front of the UV projector and a 515 nm, 550 nm, or 590 nm long pass filter in front of the camera. FIGS. 20A and 20B show high-resolution images of the inventors in which the imaging distances were optimized. FIGS. 20A to 20C shows a series of animations at 30 fps, in which a college mascot can be seen running in three dimensions.

Figure 22A:
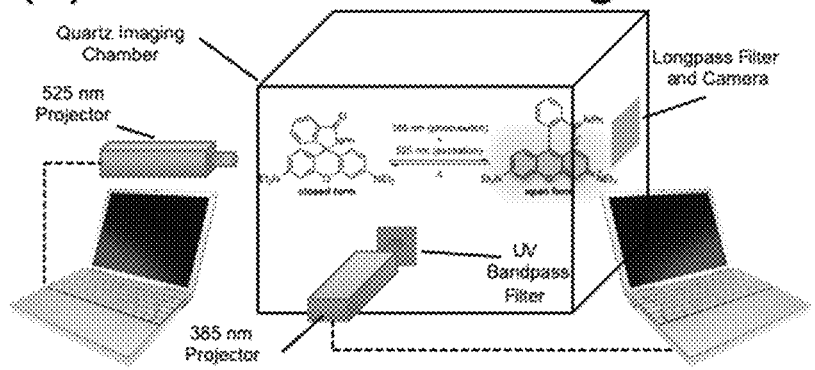
FIGS. 22A and 22B show a schematic of the three-dimensional digital light photoactivatable dye (3D Light PAD) technology (FIG. 22A), and high resolution 3D images in the 3D Light PAD.
Figure 22A:
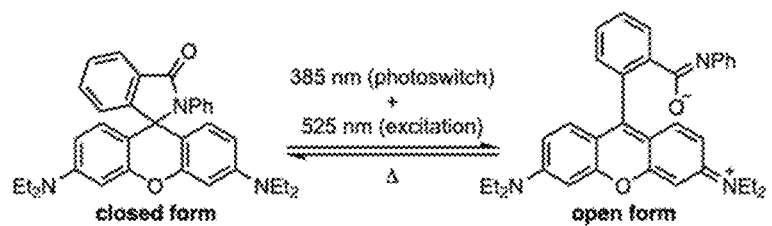
Figure 22B:
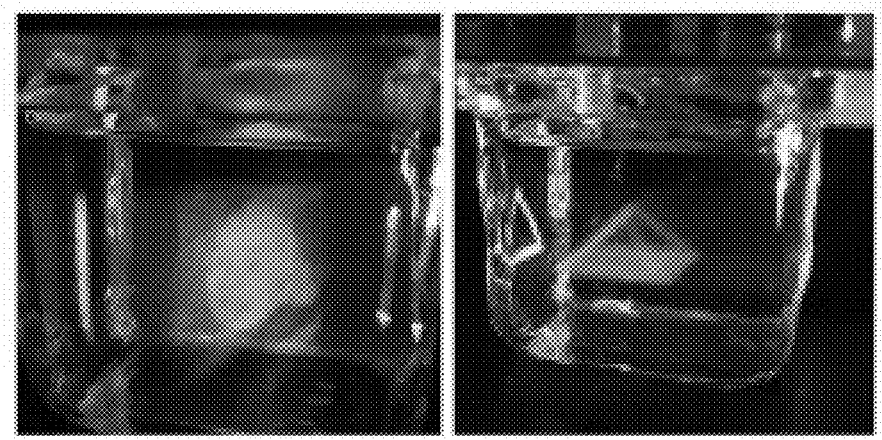

Volumetric 3D printing overcomes the low throughput, geometric restrictions, structural defects, and problems of scaling endemic to additive manufacturing. Addressing these challenges is crucial for the development and fabrication of the advanced solar modules needed for the U.S. to remain competitive in solar energy. FIGS. 22A and 22B shows the unique volumetric 3D printer based on volumetric three-dimensional digital light photoactivatable dye (3D Light PAD) technology. A 3D Light PAD display capable of projecting high resolution 3D images and animation into a volume of space, is shown hereinabove. This example adapts this technology for the development of a high speed and high-resolution 3D Light PAD printer capable of fabricating a wide range of complex components for solar cell manufacturing. One example of the use for this project is the fabrication of solar energy components and broadly impact industrial productivity.

The basic operating principle of the volumetric 3D Light PAD printer of the present invention is the use of a photoswitchable photoinitiator to direct polymerization to points only at the intersection of two different wavelengths of light. This is shown in the examples hereinabove in the context of a volumetric 3D Light PAD display using photoswitchable fluorophores (FIGS. 22A and 22B). An N-phenylspirolactam rhodamine photoswitch is switched into an "on"-state using ultraviolet light, which can be excited at 525 nm to emit 585 nm light (FIG. 22A). DLP projectors were used to pattern 385 nm UV light and 525 nm visible light and high-resolution 3D images and animations could be formed.

In order to solidify these 3D patterns and convert the 3D Light PAD display into a 3D Light PAD printer, a photoswitchable fluorophore is replaced with a photoswitchable photoinitiator. The photoswitchable photoinitiator enables the initiation of polymerization with a wide variety of photocurable resins to provide an advanced manufacturing method for complex solar energy components.

Non-limiting examples of photo-catalyzable or -curable monomer include acrylates, styrene, acrylate functionalized oligomers, styrene functionalized oligomers, and/or thiol-ene monomers. The skilled artisan will recognize that any of a number of photo-catalyzable or -curable monomers can be used with the present invention, for example, SUB, Visijet SL Impact, Visijet SL Tough, Somos 8110, Somos 8120, Somos 14120, Endur RGD450, Digital ABS, and/or TangoPlus FLX930. Non-limiting examples of monomers are taught by Ligon-Auer, at al., "Toughening of photo-curable polymer networks: a review", Polym. Chem., 2016, 7, 257-286, relevant portions and monomers incorporated herein by reference.

The key innovation of this design is the use of a photoswitchable photoinitiator to direct polymerization only at the intersection of two different wavelengths of light. This enables precise 3D patterning of the triplet excited states needed to initiate polymerization and is a concept that has not been previously explored. The 3D Light PAD printer (T3DP) can be used with, e.g., an aerosol-jet-assisted perovskite deposition method for fabricating high quality solar cells on the complex surfaces developed by AsterTech (Dayton, Ohio). Aerosoljet-assisted printing of metal-halide perovskite can be expanded beyond solar panel materials. The aerosol-jet-assisted technology operates by atomizing a metal-halide perovskite ink using high-frequency acoustic vibrations. A nitrogen gas flow through the atomized ink generates an aerosol that can be directed through a x-y-z translated nozzle to print perovskite layers onto complex 3D geometries. T3DP can also be used to optimize volumetric T3DP for use with electrically conductive polymers. Other uses of the T3DP is with rinse-out resins in order to fabricate complex conductive solar components and master parts for casting. The T3DP can be incorporated into high-throughput manufacturing techniques for complex solar panel architectures through T3DP's synergistic combination of the volumetric T3DP and the aerosol-jet-assisted printing of perovskites onto complex 3D surfaces.

In one non-limiting example, the T3DP can initially have a resolution of 75 μm and a build volume of 18.9 cm×11.8 cm×32.6 cm on a wide range of photocurable resins to compare directly with existing state-of-the-art 3D printers. However, using higher resolution digital light processing (DLP) chips, e.g., a DLP470TE with 3840×2160 display resolution and DLP9500UC with 1920×1080 display resolution, higher resolutions can be achieved.

Additive manufacturing enables the fabrication of materials such that increased complexity essentially comes free of cost. While additive manufacturing is gaining traction as a fabrication technique, the layer by layer building of materials enforces severe restrictions, including low throughput, geometric restrictions, structural defects, and limitations on scaling. A benchmark comparison is a continuous liquid interface printing developed by Carbon, which has developed a technology to continuously print 3D objects, overcoming some of the issues with a layer-by-layer approach. Their approach relies on oxygen inhibition to generate a dead zone and localize polymerization to an area below this surface. While effective for 3D printer architectures that use an elevator-like build, the need for this oxygen-rich dead zone results in certain geometric and engineering constraints.

A volumetric 3D printer of the present invention overcomes these challenges by fabricating materials simultaneously at multiple points within a volume of 3D space. Indeed, the improvements of this approach are seen in recent innovations that use various techniques for volumetric 3D printing. Most examples depend on either the same oxygen inhibition as described above or holography techniques that pose their own geometric restrictions. Capitalizing on the advantages of volumetric 3D printing requires precise spatiotemporal control of photoinitiation and our team's development of an innovative photoswitchable photoinitiator for dual-wavelength control offers an elegant solution to this issue. Importantly, oxygen inhibition is used to limit off-pattern polymerization in contradistinction to the disclosed concept that uses a photoswitchable photoinitiator regardless of the presence of oxygen. Thus, the present invention operates with or without oxygen in the medium.

Synthetic Library of Fluorescent Photoswitches for Imaging or Printing.

The present inventors chemically synthesized a library of spirolactam rhodamine photoswitches. Structures 1-4 have electron-donating groups where a pair of electrons associated with the oxygens is expected to push the structure towards the closed and colorless confirmation. Structures 5-8 have electron withdrawing groups due to electronegative halogen atoms and is expected to pull the structure into an open and fluorescent confirmation. Structures 9-12 have bulky groups that increase the steric hindrance of the closed confirmation and is expected to shift the equilibrium towards the open and fluorescent confirmation.

Structures 1-4. Electron Donating Groups

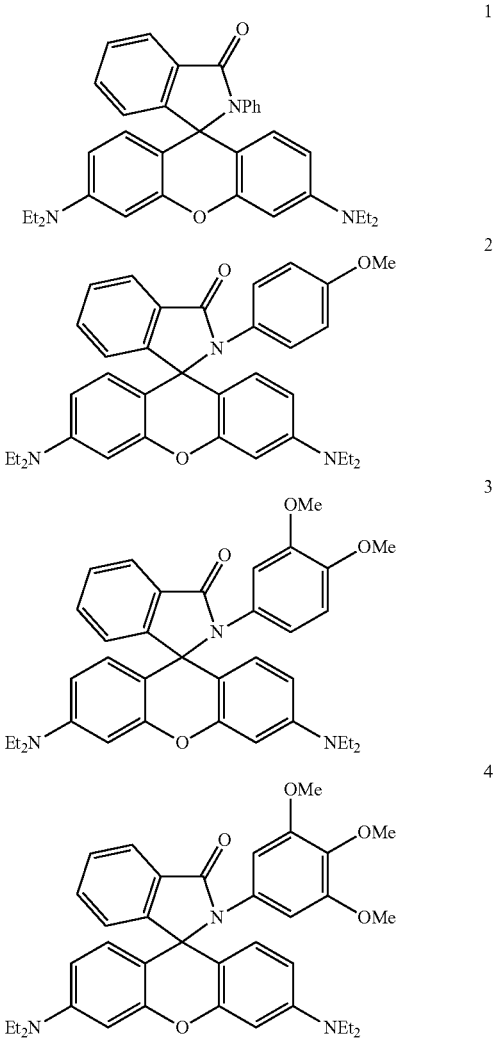

Structures 5-8. Electron Withdrawing Groups

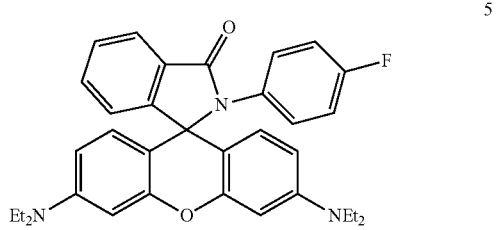

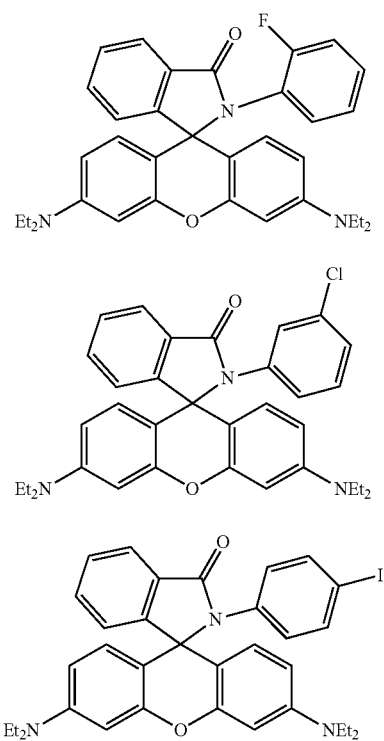

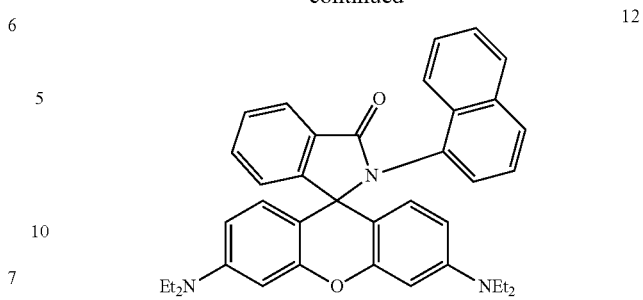

Structures 9-12. Sterically Hindered Donating Groups

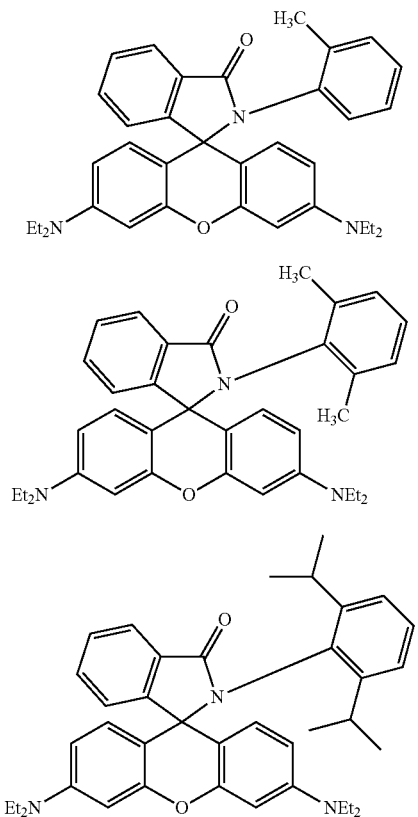

Figure 23:
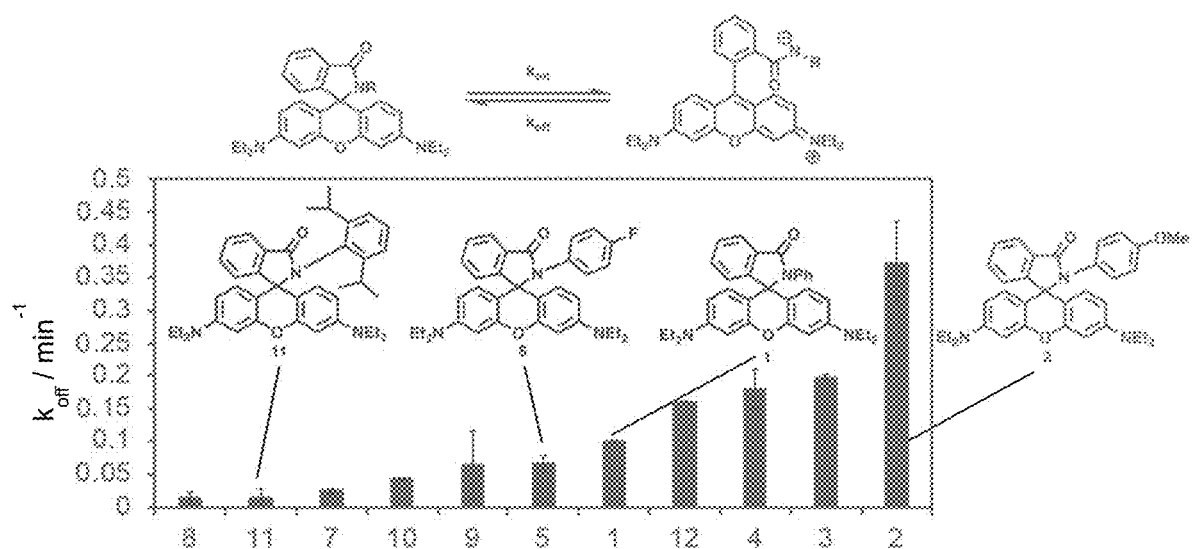
FIG. 23 shows the off rates of these molecules were measured and it was found that electron donating structure increased off rate (entries 2-4).

FIG. 23 shows the off rates of these molecules were measured and it was found that electron donating structure increased off rate (entries 2-4). It was found that the electron withdrawing and sterically hindered groups decreased the off-rate. Thus, the molecules can be used to tune rates as needed.

Figure 24:
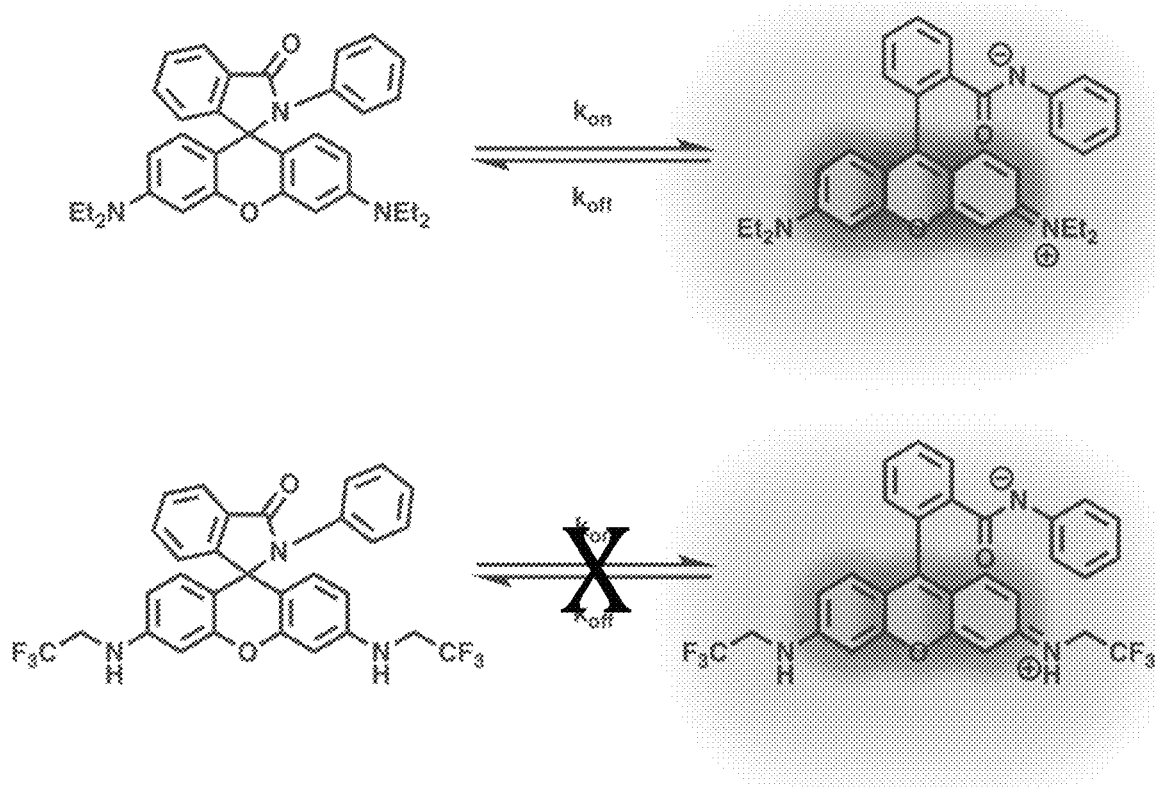
FIG. 24 shows the development of different colors of photoswitches.

Photoswitches. Molecular Tuning of Color. Electron withdrawing groups blue-shift groups, but shuts down turn-on. FIG. 24 shows the development of different colors of photoswitches. It was found that adding fluorines to the core of the chromophore blue-shifts the emission maximum, presumably by decreasing the energy of the HOMO and increasing the energy of the LUMO. The addition of fluorines however, pulls the molecule into a closed confirmation and essentially shuts down photoswitching.

Figure 25:
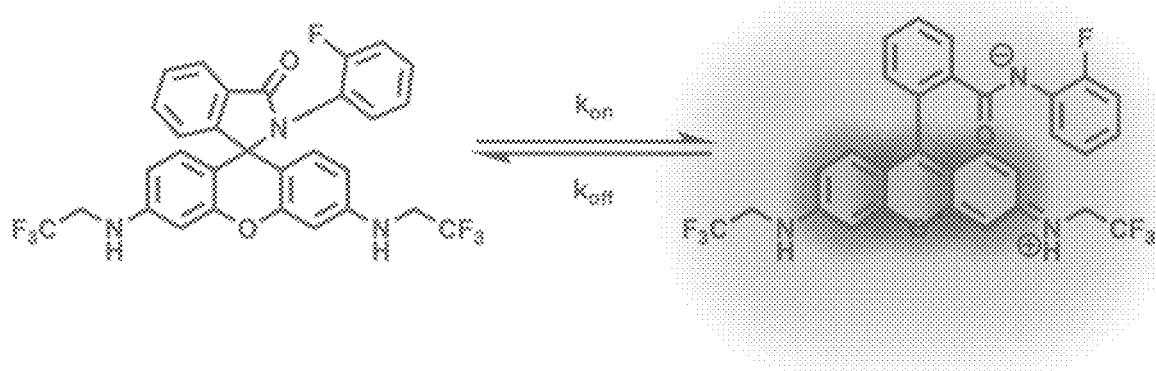
FIG. 25 shows that it is possible to add an electron withdrawing group to the top-ring to balance the electron withdrawing group on the bottom ring and photoswitching is recovered.

Balancing the inductive forces results in efficient photoswitching behavior. As a result of the structural studies, it is now possible to tune the photoswitching. FIG. 25 shows that it is possible to add an electron withdrawing group to the top-ring to balance the electron withdrawing group on the bottom ring and photoswitching is recovered.

Thus, it was possible to develop a green dye for the 3D Light PAD application. The inventors used blue light to excite the fluorescence and a 254 nm UV lamp to induce photoswitching, thus creating a green voxel. Next, it is possible to the red and the green photoswitch together and can make a multicolor cube. It is also possible to shine UV light simultaneously to open both photoswitches and the color is determined by the visible light used to excite fluorescence. Thus, a green emission is formed with blue light and red is formed with blue light.

Figure 26:
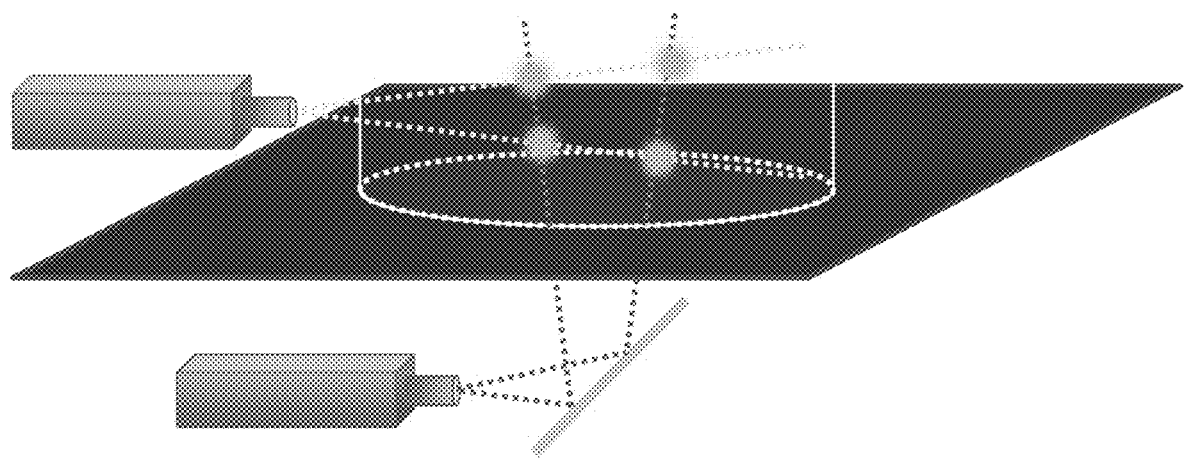
FIG. 26 shows one schematic of the 3D Digital Light PhotoActivable Dye Display of the present invention.
Figure 27:
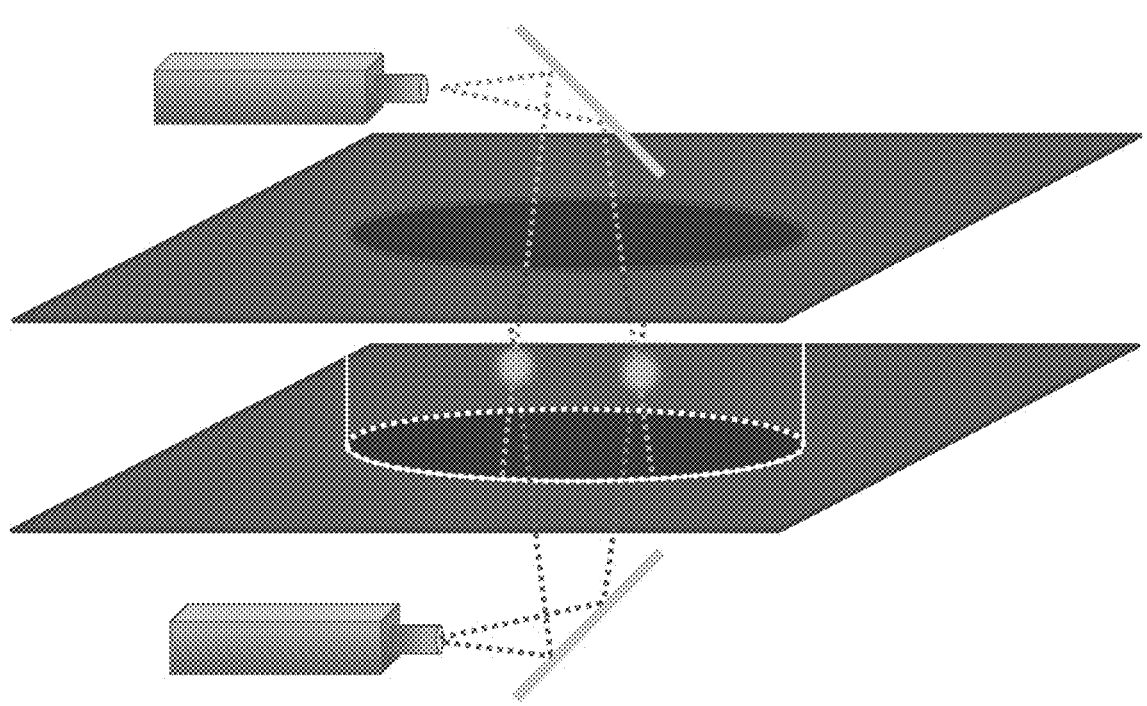
FIG. 27 shows another embodiment in which light is transmitted from the top and bottom.
Figure 28:
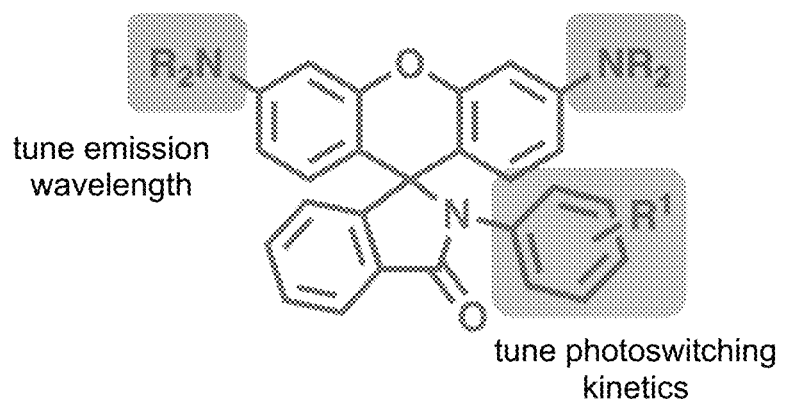
FIG. 28 shows the chemical tuning of spirolactam rhodamine photoswitches.

Green light reflectance was overcome by projecting the green light from the bottom. FIG. 26 shows one schematic of the 3D Digital Light PhotoActivable Dye Display of the present invention. FIG. 27 shows another embodiment in which light is transmitted from the top and bottom. FIG. 28 shows the chemical tuning of spirolactam rhodamine photoswitches.

Thus, using the present molecules it was possible to provide enhanced contrast and image quality using the on-off photoswitching rates. It was found that contrast is proportional to $k_{on}/k_{off}$. Low $k_{off}$ tends to lead to poor image quality due to diffusion. $k_{off}$ can be increased by addition of the base triethylamine.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An apparatus for generating a three-dimensional product, the system comprising:
   a medium comprising an optical molecular switch molecule, wherein the optical molecular switch molecule has a non-fluorescent state and a fluorescent state, wherein at one wavelength of optical excitation the optical molecular switch molecule has a first state, and at a second state the optical molecular switch molecule fluoresces at a second wavelength of excitation;
   a photo-catalyzable or photo-curable monomer in the medium; and
   at least a first light source and a second light source into the medium, wherein light emitted by the at least first and second light sources are directed to contact the optical molecular switch molecule;
   wherein the optical molecular switch molecule is converted into a fluorescent "on state" by irradiation from the first light source, and when the second light source irradiates the optical molecular switch molecule in the "on state" the optical molecular switch molecule emits light, wherein the photo-catalyzable or photo-curable monomer polymerizes into a polymer at a point of contact between the first and second light sources.

2. The apparatus of claim 1, wherein at least one of:
   (a) the first and the second light source intersect the optical molecular switch molecule excites and releases light;
   (b) the first or the second light source is a pulsed laser thereby to produce an improved voxel to background emission;
   (c) the first and the second light source scan across the medium, wherein the optical molecular switch molecule that excite and emit light in the medium create the three-dimensional image; and/or
   (d) the light sources are selected to match the wavelength of excitation of the optical molecular switch molecule, and/or the first, the second or both light sources are lasers.

3. The apparatus of claim 1, wherein the optical molecular switch molecule is selected from at least one of an acridine, an anthracene, an arylmethine, a cyanin, a coumarin, an oxacine, an oxadiazole, a naphthalene, a pyrene, a squaraine, a tetrapyrrole, a xanthene, a spirhodamine, a spirolactam rhodamine, or other common fluorescent, phosphorescent, long-lifetime luminescent, or chemiluminescent scaffolds, or derivatives thereof.

4. The apparatus of claim 1, wherein the optical molecular switch molecule is attached to the medium, and wherein the medium is liquid, solid, a liquigel, organic, inorganic, thixotropic, a crystal, a glass, a gel, a polymer, a gas, and combinations thereof.

5. The apparatus of claim 1, wherein the optical molecular switch molecule is a protein, and wherein the optical molecular switch molecule is a green fluorescent protein, cyan fluorescent protein, yellow fluorescent protein, red fluorescent protein, gold fluorescent protein a saturation dye, an acceptor fluorophore, a donor fluorophore, and combinations thereof.

6. The apparatus of claim 1, wherein the optical molecular switch molecule is capable of energy transfer selected from fluorescence resonance energy transfer (FRET), through-bond energy transfer (TBET), or fluorescence resonance energy transfer (FRET) with a molecular-beacon.

7. The apparatus of claim 1, wherein at least three optical molecular switch molecules excited in the UV range, and emits in a range that triggers polymerization or curing of the photo-catalyzable or -curable monomer in the medium.

8. The apparatus of claim 1, wherein the optical molecular switch molecule is resuspended in a solvent or a base selected from at least one of dioxane, tetrahydrofuran, acetone, methanol, ethanol, isopropanol, water, diisopropyl ethylamine, pyridine, carbonate, or bicarbonate.

9. The apparatus of claim 1, wherein the photo-catalyzable or -curable monomer is selected from at least one of: acrylates, styrene, acrylate functionalized oligomers, styrene functionalized oligomers, or thiol-ene monomers.

10. The apparatus of claim 1, wherein at least one of:
   (a) each of the first light source or the second light source projects a three-dimensional images by rapid scanning of the first or second light source, and the other light source is synchronized with a changing patterned of light to form a three dimensional image in the medium;
   (b) each of the first light source or the second light source displays a three-dimensional image by projecting light into a woven pattern into the medium; and/or
   (c) each of the first light source or the second light source displays a three-dimensional image by projecting light into a diagonal pattern into the medium.

11. The apparatus of claim 1, wherein an agent that filters stray light is provided in the medium or a surface of a vessel that contains the medium.

12. The apparatus of claim 1, wherein an angle formed between the light emitted from the first light source and the light emitted by the second light sources is at an angle other than 90 degrees.

13. The apparatus of claim 1, wherein the first light source, the second light source, or both, is a Digital Light Processor.

14. The apparatus of claim 1, wherein the first light source is a UV projector with a short pass filter, and the second light source uses a long pass filter before a camera, and optionally the short pass filter is a 395 nm filter, and the long pass filter is at least one of a 515, a 550, or a 590 nm filter.

15. A method of printing a three dimensional object comprising:
   providing a medium comprising a photocurable monomer and an optical molecular switch molecule, wherein the optical molecular switch molecule has a non-fluorescent state and a fluorescent state, wherein at one wavelength of optical excitation the molecule has a first state and at a second state the molecule fluoresces a second wavelength of excitation; and
   directing at least a first laser and a second laser into the medium, wherein light emitted by the at least first and second lasers are directed to contact the optical molecular switch molecule in the medium;
   wherein the optical molecular switch molecule is converted into a fluorescent "on state" by irradiation from the first laser, and when the second laser irradiates the optical molecular switch molecule in the "on state" the optical molecular switch molecule emits light; and
   wherein the monomer is cured into a polymer at the emitted light.

16. The method of claim 15, further comprising at least one of:
   (1) the step of intersecting the first and the second laser at the optical molecular switch molecule to excite and release light;
   (2) the step of pulsing the first or the second laser to produce an improved voxel to background emission in the image; and/or
   (3) the step of scanning the first and the second laser scan across the medium, wherein the optical molecular switch molecule excites and emits light in the medium create the three dimensional image.

17. The method of claim 15, further comprising the step of selecting the optical molecular switch molecule from at least one of an acridine, an anthracene, an arylmethine, a cyanin, a coumarin, an oxacine, an oxadiazole, a naphthalene, a pyrene, a squaraine, a spirhodamine, a spirolactam rhodamine, a tetrapyrrole, a xanthene, or other fluorescent, phosphorescent, long-lifetime luminescent, or chemiluminescent scaffolds, or derivatives thereof for the light switching.

18. The method of claim 15, further comprising the step of attaching the optical molecular switch molecule to the medium.

19. The method of claim 15, further comprising the step of selecting the medium from a liquid, solid, a liquigel, organic, inorganic, thixotropic, a crystal, a glass, a gel, a polymer, a gas, and combinations thereof.

20. The method of claim 15, further comprising the step of selecting the lasers to match the wavelength of excitation of the optical molecular switch molecule.

21. The method of claim 15, further comprising the step of selecting the optical molecular switch molecule from one or more fluorescent proteins, a green fluorescent protein, cyan fluorescent protein, yellow fluorescent protein, red fluorescent protein, gold fluorescent protein and combinations thereof.

22. The method of claim 15, further comprising the step of selecting the optical molecular switch molecule from a saturation dye, an acceptor fluorophore, a donor fluorophore, a saturation dye, an acceptor fluorophore, a donor fluorophore, and combinations thereof.

23. The method of claim 15, further comprising the step of selecting the optical molecular switch molecule to be capable of energy transfer selected from fluorescence resonance energy transfer (FRET), through-bond energy transfer (TBET), or fluorescence resonance energy transfer (FRET) with a molecular-beacon.

24. The method of claim 15, wherein the photo-catalyzable or -curable monomer is selected from at least one of: acrylates, styrene, acrylate functionalized oligomers, styrene functionalized oligomers, or thiol-ene monomers.

25. The method of claim 15, further comprising at least one of:
   (a) the step of selecting the optical molecular switch molecule to provide at least three different colors that provide for color images;

(b) the step of viewing the image in three dimensions without glasses or tricking the brain to appear three-dimensional;

(c) the step of displaying a three-dimensional images by rapid scanning of the first or second light source, and the other light source is synchronized with a changing patterned of light to form a three dimensional image in the medium;

(d) the step of displaying a three-dimensional image by projecting light into a woven pattern into the medium; and/or (e) the step of displaying a three-dimensional image by projecting light into a diagonal pattern into the medium.

26. The method of claim 15, wherein the optical molecular switch molecule is resuspended in a solvent or a base selected from at least one of dioxane, tetrahydrofuran, acetone, methanol, ethanol, isopropanol, water, diisopropyl ethylamine, pyridine, carbonate, or bicarbonate.

27. The method of claim 15, wherein an agent that filters stray light is provided in the medium or a surface of a vessel that contains the medium.

28. The method of claim 15, wherein an angle formed between the light emitted from the first light source and the light emitted by the second light sources is at an angle other than 90 degrees.

29. The method of claim 15, wherein the first light source, the second light source, or both, is a Digital Light Processor.

30. The method of claim 15, wherein the first light source is a UV projector with a short pass filter, and the second light source uses a long pass filter before a camera, optionally the short pass filter is a 395 nm filter, and the long pass filter is at least one of a 515, a 550, or a 590 nm filter.

31. A printer comprising:
an imaging system comprising:
a medium comprising a photocurable monomer and an optical molecular switch molecule, wherein the optical molecular switch molecule has a non-fluorescent state and a fluorescent state, wherein at one wavelength of optical excitation the molecule has a first state and at a second state the molecule fluoresces a second wavelength of excitation;
at least a first light source and a second light source in optical communication with the medium, wherein light emitted by the at least first and second light sources are directed to contact the optical molecular switch molecule at a specific location in the medium;
a memory, configured to store a representation of the three dimensional image; and
a processor, operably coupled to the memory and the first light source and the second light source, wherein the processor is configured to direct the first and the second light source into the medium to convert the optical molecular switch molecule into a fluorescent "on state" by irradiation from the first light source, and when the second light source irradiates the optical molecular switch molecule in the "on state" the optical molecular switch molecule emits light at the specific location in the medium, wherein the monomer is cured into a polymer at the emitted light.

32. A system for printing in three dimensions comprising:
an imaging system comprising:
a medium comprising a photocurable monomer and an optical molecular switch molecule, wherein the optical molecular switch molecule has a non-fluorescent state and a fluorescent state, wherein at one wavelength of optical excitation the molecule has a first state and at a second state the molecule fluoresces a second wavelength of excitation;
at least a first light source and a second light source in optical communication with the medium, wherein light emitted by the at least first and second light sources are directed to contact the optical molecular switch molecule at a specific location in the medium;
a memory, configured to store a representation of the three dimensional image; and
a processor, operably coupled to the memory and the first light source and the second light source, wherein the processor is configured to direct the first and the second light source into the medium to convert the optical molecular switch molecule into a fluorescent "on state" by irradiation from the first light source, and when the second light source irradiates the optical molecular switch molecule in the "on state" the optical molecular switch molecule emits light at the specific location in the medium, wherein the monomer is cured into a polymer at the emitted light, a molecule selected from at least one of:

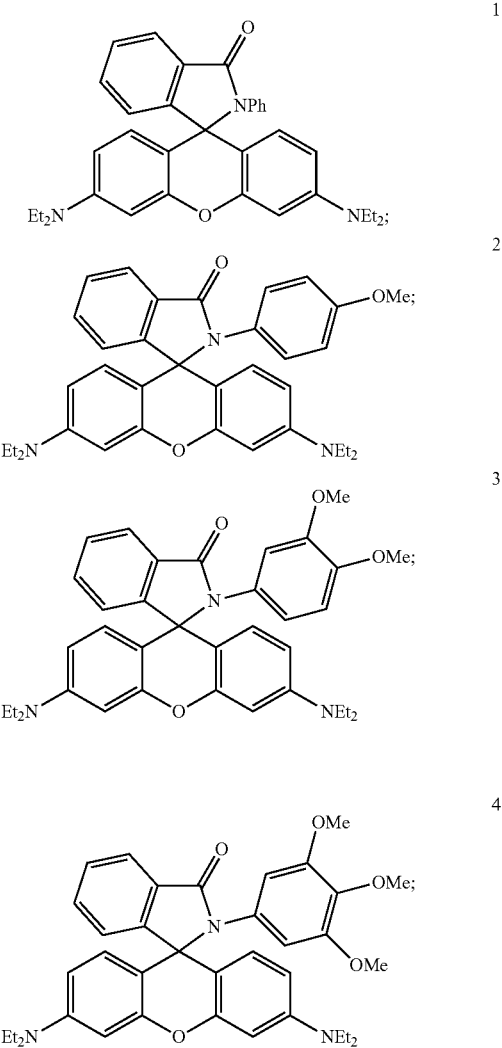

5
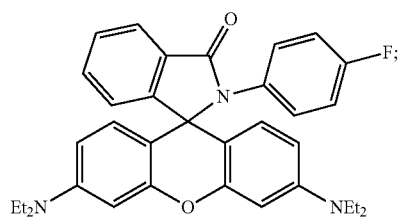
6
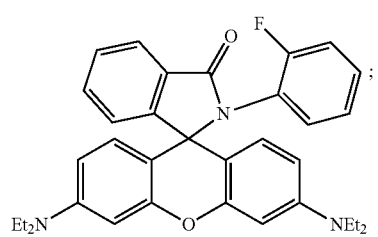
7
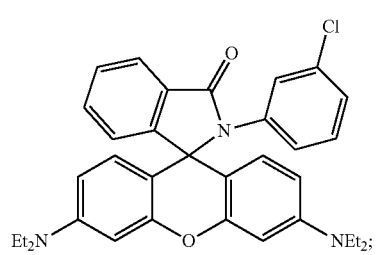
8
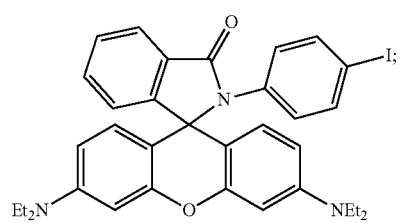
9
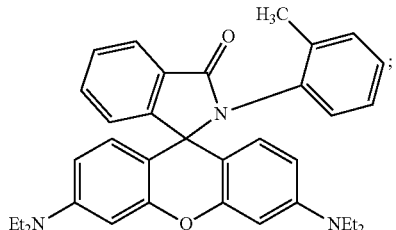
10
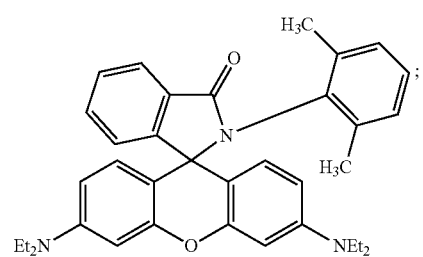
11
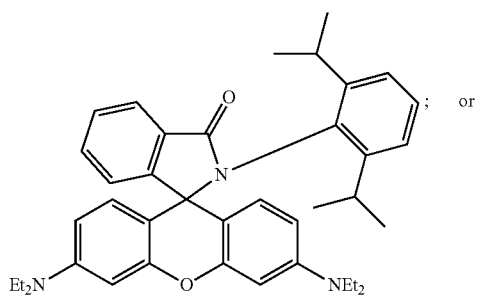
or
12
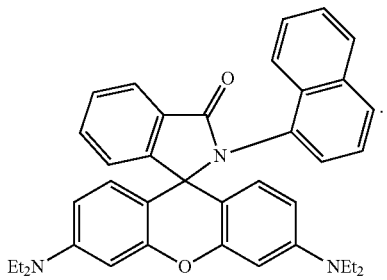
* * * * *